US011259516B2

(12) United States Patent
Riikonen et al.

(10) Patent No.: US 11,259,516 B2
(45) Date of Patent: Mar. 1, 2022

(54) METHOD AND APPARATUS FOR CAPSULAR DELIVERY TO PLANTS

(71) Applicant: BioHerbicides Australia Pty Ltd, St Lucia (AU)

(72) Inventors: Peter Riikonen, St Lucia (AU); Kenneth Clifford Goulter, Jamboree Heights (AU)

(73) Assignee: BioHerbicides Australia Pty Ltd, Queensland (AU)

(*) Notice: Subject to any disclaimer, the term of this patent is extended or adjusted under 35 U.S.C. 154(b) by 0 days.

(21) Appl. No.: 16/631,022

(22) PCT Filed: Aug. 2, 2018

(86) PCT No.: PCT/AU2018/050807
§ 371 (c)(1),
(2) Date: Jan. 14, 2020

(87) PCT Pub. No.: WO2019/023755
PCT Pub. Date: Feb. 7, 2019

(65) Prior Publication Data
US 2020/0138007 A1    May 7, 2020

(30) Foreign Application Priority Data
Aug. 2, 2017   (AU) .................. 2017903063

(51) Int. Cl.
*A01M 21/04* (2006.01)
*A01N 25/26* (2006.01)
(Continued)

(52) U.S. Cl.
CPC .......... *A01M 21/043* (2013.01); *A01M 21/00* (2013.01); *A01N 25/26* (2013.01); *A01N 57/20* (2013.01); *A01G 7/06* (2013.01)

(58) Field of Classification Search
CPC .... A01M 21/043; A01M 21/04; A01M 21/00; A01G 7/06
(Continued)

(56) References Cited

U.S. PATENT DOCUMENTS 2,795,899 A * 6/1957 Little .................. A01G 7/06
                                                    47/57.5
2,934,859 A * 5/1960 Little .................. A01G 7/06
                                                    47/57.5
(Continued)

FOREIGN PATENT DOCUMENTS

CA    1191346 A     8/1985
CH    513581 A    10/1971
(Continued)

OTHER PUBLICATIONS

International Search Report and Written Opinion corresponding to International Application No. PCT/AU2018/050807 dated Oct. 2, 2018.
(Continued)

Primary Examiner — Brady W Frazier
Assistant Examiner — Zoe Tam Tran
(74) Attorney, Agent, or Firm — Myers Bigel, P.A.

(57) ABSTRACT

A method of controlling the growth of a plant is provided, the method including the steps of: (a) inserting a capsule containing an agent into an opening formed in a plant; and (b) closing the opening formed in the plant into which the capsule is inserted. The agent may be a chemical agent. The plant may be a woody plant, such as a woody weed or a woody cultivated plant. Also provided is a capsule containing an agent for insertion into a plant, and an apparatus for insertion of a capsule into a plant.

18 Claims, 22 Drawing Sheets

(51) Int. Cl.
*A01N 57/20* (2006.01)
*A01M 21/00* (2006.01)
*A01G 7/06* (2006.01)

(58) Field of Classification Search
USPC ............ 175/52, 85, 164; 414/22.66; 47/57.5
See application file for complete search history.

(56) References Cited

U.S. PATENT DOCUMENTS

| | | | | |
|---|---|---|---|---|
| 3,605,914 | A * | 9/1971 | Kramer | B25B 21/026 173/93 |
| 4,400,028 | A * | 8/1983 | Conrad | B25B 13/481 173/213 |
| 4,905,410 | A * | 3/1990 | Merving | A01G 7/06 47/57.5 |
| 4,915,256 | A * | 4/1990 | Tump | B65D 83/0463 116/308 |
| 4,962,681 | A * | 10/1990 | Yang | B25B 21/00 408/20 |
| 5,046,281 | A * | 9/1991 | Murphy | A01G 7/06 47/57.5 |
| 5,606,758 | A * | 3/1997 | Tung | B25B 15/00 7/138 |
| 6,311,429 | B1 | 11/2001 | Wolfe | |
| 9,364,903 | B2 * | 6/2016 | Hall | B23B 51/08 |
| 2004/0255512 | A1 * | 12/2004 | Burgess | A01G 7/06 47/57.5 |
| 2007/0266628 | A1 * | 11/2007 | Doolittle | A01G 7/06 47/57.5 |
| 2015/0101462 | A1 * | 4/2015 | Walters | B25B 21/00 81/451 |
| 2017/0160029 | A1 * | 6/2017 | Huang | F41A 9/27 |
| 2017/0320197 | A1 * | 11/2017 | Dicaire | B25B 21/002 |
| 2018/0000526 | A1 * | 1/2018 | O'Neil | A61B 90/39 |

FOREIGN PATENT DOCUMENTS

| | | | |
|---|---|---|---|
| EP | 0139318 A1 | 5/1985 | |
| FR | 891350 A | 3/1944 | |
| WO | 9638033 A1 | 12/1996 | |
| WO | 2008039122 A1 | 4/2008 | |
| WO | 2012101426 A1 | 8/2012 | |
| WO | WO-2016008321 A * | 1/2016 | ............... B25H 3/02 |

OTHER PUBLICATIONS

International-Type Search Report corresponding to Australian Application No. 2017903063 dated Mar. 15, 2018.
Weed Control [retrieved from internet on Mar. 6, 2018] https://web.archive.org/web/20170219201208/http://www.bioherbicides.com.au/bhaweedcontrol/ published on Feb. 19, 2017 as per Wayback Machine.
Copperhead herbicide shells [retrieved from internet on Mar. 7, 2018] https://web.archive.org/web/*/http://www.ezject.com/?page_id=1064 published on Oct. 16, 2016 as per Wayback Machine.
Diamondback herbicide shells [retrieved from internet on Mar. 7, 2018] https://web.archive.org/web/*/http://www.ezject.com/?page_id=547 published on Oct. 16, 2016 as per Wayback Machine.
International Preliminary Report on Patentability corresponding to International Application No. PCT/AU2018/050807 dated Feb. 13, 2020.

* cited by examiner

METHOD AND APPARATUS FOR CAPSULAR DELIVERY TO PLANTS

CROSS-REFERENCE TO RELATED APPLICATIONS

This application is a 35 U.S.C. § 371 national phase application of PCT Application PCT/AU2018/050807, filed Aug. 2, 2018, which claims the benefit of priority of Australian provisional application No. 2017903063, filed Aug. 2, 2017, the entire contents of each of which are incorporated herein by reference in its entirety for all purposes.

FIELD OF THE INVENTION

This invention relates to methods for regulating the growth of plants, such as woody plants including trees and shrubs. More particularly, the invention relates, but is not limited, to methods of inserting a capsule containing an agent into a plant to regulate the growth of the plant. The invention also relates to capsules containing an agent for insertion into a plant to regulate the growth of the plant, and an apparatus for insertion of capsules into a plant.

BACKGROUND TO THE INVENTION

Exotic and endemic trees and shrubs can be problematic weeds under a variety of circumstances.

For example, under rangeland conditions weed trees and shrubs can form dense thickets that result in reduced stocking rates by displacing pasture, impede mustering, and restrict access to water. Where dense thickets are not produced it is likely that weed trees will shade and outcompete pasture grasses. These problems lead to reduced pasture productivity and accessibility. Weed trees and shrubs can also be problematic in waterways and wetlands, and in rights of way such as beside roads and railway lines, utility lines such as above ground power lines, and stock routes. Furthermore, introduced 'amenity' trees and shrubs can become weeds as they spread from gardens and parks into native forests. The weeds can impact the biodiversity and conservation value of the forest by outcompeting native plants and altering species assemblages.

Various strategies for herbicide-based control of weeds, including weed trees and shrubs, exist, which are described briefly as follows.

Foliar sprays for herbicidal weed control are applied either aerially, by tractor driven boom, or by smaller spot sprayer or splatter gun. The herbicide compound is often dissolved in a water miscible solvent, then diluted into a water solution with the possible addition of adjuvants to aid solubility, break down target surface tension, or improve adherence to the target.

The wick or wiper method involves rubbing a herbicide soaked wiper onto the target species. It has most utility in cropping systems were the weed is taller that the crop and can therefore be selectively treated.

Basal bark application is performed by spraying the base of target trees or shrubs, typically with a mixture of herbicide and diesel distillate to assist penetration through the bark. It is generally only recommended for use on plants less than 5 cm in diameter.

For larger woody weeds, the cut stump method, as the name suggests, is performed by felling the weed tree or shrub and painting or spraying the cut surface with a herbicide that is taken up and poisons the stump. Cut, scrape and paint is a variant of cut stump where an instrument (knife, chisel) is used to scrape off a section of bark remaining on the stump before herbicide treatment to ensure increased uptake of the herbicide.

Conventional stem injection methods also exist wherein herbicide is typically applied in either of two ways, 'frill and fill' or 'drill and fill'. With frill and fill, an axe or chisel is used to cut into the stem (typically at an around 45° angle) to form a 'frill', before the herbicide is applied to the cut. In drill and fill a hole is drilled into the weed, that is then filled with herbicide.

Although suitable for weed control in many circumstances, the above described herbicide application methods are associated with various disadvantages. For example, the methods may require the handling of herbicide compositions in toxic forms; may be of limited effectiveness for certain weed types; may require monitoring of movement or transmission of applied herbicides from the site of application; may involve imprecise or excessive herbicide application; and/or may involve the use of relatively dangerous equipment. As such, new strategies for herbicidal control of weeds are desirable.

In a broad sense, strategies for herbicidal control of weeds will typically involve contacting a herbicide with the weed, to inhibit or restrain growth of the weed. It will be appreciated that desirable new strategies might also be developed involving contacting other agents with other plants, to exert other effects on such plants. For example, delivery of a suitable agent to a cultivated plant could enhance growth of or control disease in the cultivated plant. In at least some circumstances, it would be particularly desirable to develop new strategies that could be flexibly applied to herbicidal control of weeds, and to delivery of other agents to other plants.

SUMMARY OF THE INVENTION

The present invention is broadly directed to a method for regulating the growth of a plant, such as a woody plant, by inserting a container, such as a capsule, comprising an agent into the plant. The invention is also broadly directed to a container, such as a capsule, comprising an agent for insertion into a plant to regulate the growth of the plant. The invention is further broadly directed to an apparatus for insertion of a container, such as a capsule, into a plant.

In a first aspect, the invention provides a method of controlling the growth of a plant, the method including the steps of:

(a) inserting a capsule containing an agent into an opening formed in a plant; and (b) closing the opening formed in the plant into which the capsule is inserted.

Suitably, the agent may be of a composition.

In certain preferred embodiments, the agent is a chemical agent.

In an embodiment, the plant according to this aspect is a weed.

In an embodiment, the plant according to this aspect is a cultivated plant.

Preferably, the plant according to this aspect is a woody plant, such as a tree, shrub, or liana.

In preferred embodiments, the opening in the plant is formed in a stem or branch of the plant. Preferably, the opening is formed in the stem of the plant.

Suitably, the opening is formed by penetration of the plant. Preferably, the opening is formed by drilling.

In particularly preferred embodiments, the opening formed in the plant has a diameter of between about 2 mm to about 30 mm; more preferably between about 4 mm to about 15 mm.

In particularly preferred embodiments, the opening formed in the plant has a depth of about 5 mm to about 50 mm; more preferably between about 10 mm to about 50 mm.

Preferably, an innermost end of the opening formed in the plant is located in sapwood of the plant.

In preferred embodiments of this aspect, the capsule inserted into the plant is located within sapwood of the plant.

Suitably, the capsule containing the agent according to this aspect is a soluble capsule. Preferably, the capsule is water-soluble. In preferred such embodiments, the capsule is formed from or comprises a material selected from the group consisting of water soluble alginate; polysaccharide; cellulose; polyethylene glycol, or derivatives thereof.

In preferred embodiments, the agent or composition comprising the agent contained by the capsule is in solid form. Suitably, the solid agent or composition may be in powder or granular form. Preferably, the solid agent or composition is dry or substantially dry.

In embodiments wherein the plant is a weed, preferably the agent is a chemical herbicide. In particularly preferred embodiments, the chemical herbicide is or includes an active agent selected from the group consisting of diuron, glyphosate, hexazinone, imazapyr, metsulfuron-methyl, picloram, tebuthiuron, or triclopyr. In certain preferred embodiments, the chemical herbicide is of a composition including two or more of said active agents.

In embodiments wherein the plant is a cultivated plant, preferably the agent is selected from the group consisting of a pesticide; a fertiliser; and a growth stimulant. Preferably, the agent is selected from the group consisting of a chemical pesticide; a chemical fertiliser; and a chemical growth stimulant.

Suitably, the opening formed in the weed is closed using an insoluble closure. Preferably, the closure is water-insoluble. In some embodiments the water-insoluble closure is formed from or comprises a material selected from the group consisting of metal; wood; cork; plastic; and natural or synthetic rubber. In some embodiments, the water-insoluble closure is an elastomer, inclusive of natural and synthetic elastomers. In one preferred embodiment, the water-insoluble closure is or comprises polypropylene.

In a second aspect, there is provided a capsule containing an agent for insertion into a plant to regulate the growth of the plant. Preferably the capsule is for use according to the method of the first aspect.

Preferably, the capsule is a soluble capsule. Preferably, the capsule is water-soluble. In preferred such embodiments, the capsule is formed from or comprises a material selected from the group consisting of water-soluble alginate; polysaccharide; cellulose; polyethylene glycol, or derivatives thereof.

Suitably, the agent contained by the capsule may be of a composition.

In preferred embodiments of this aspect, the agent or composition comprising the agent contained by the capsule is in solid form. Suitably, the agent or composition may be in powder or granular form. Preferably, the solid agent or composition is dry or substantially dry.

In an embodiment, the agent is a herbicide. In certain preferred embodiments, the herbicide is a chemical herbicide. In particularly preferred embodiments wherein the agent is a chemical herbicide, the chemical herbicide is or includes an active agent selected from the group consisting of diuron, glyphosate, hexazinone, imazapyr, metsulfuron-methyl, picloram, tebuthiuron, or triclopyr. In certain preferred embodiments, the chemical herbicide is of a composition including two or more of said active agents.

In an embodiment, the agent is selected from the group consisting of a pesticide; a fertiliser; and a growth stimulant. In certain preferred embodiments, the agent is selected from the group consisting of a chemical pesticide; a chemical fertiliser; and a chemical growth stimulant.

In a third aspect, there is provided a kit comprising a capsule of the second aspect, and a closure, wherein the closure is for closing an opening formed in a plant into which the capsule is inserted. Preferably the kit is for use according to the method of the first aspect.

Suitably, the closure is an insoluble closure. Preferably, the closure is water-insoluble. In some embodiments the water-insoluble closure is formed from or comprises a material selected from the group consisting of metal; wood; cork; plastic; or natural or synthetic rubber. In some embodiments, the water-insoluble closure is an elastomer, inclusive of natural and synthetic elastomers. In one preferred embodiment, the water-insoluble closure is or comprises polypropylene.

In a fourth aspect, there is provided an apparatus for insertion of a capsule into a plant, the apparatus comprising:
a housing for containing a capsule for insertion into a plant;
a channel member connected to the housing; and
an adjustable member capable of movement within the channel member,
wherein movement of the adjustable member within the channel member facilitates:
(i) penetration of a plant to form an opening in a plant; and
(ii) insertion of the capsule from the housing into the plant.

Preferably, the housing is movable relative to the channel member to position a capsule for insertion into a plant. Preferably, the housing is rotatable relative to the channel member to position a capsule for insertion into a plant.

Preferably, the housing is capable of holding a plurality of capsules for insertion into a plant. In preferred embodiments, the housing comprises a plurality of compartments for containing the respective plurality of capsules for insertion into a plant. Preferably, said compartments are discrete compartments.

In preferred embodiments, movement of the housing relative to the channel member to position a capsule for insertion into a plant includes aligning a compartment for containing a capsule with a channel of the channel member.

In preferred embodiments, the housing is connected to the channel member by a housing support. Preferably, the housing support facilitates rotation of the housing relative to the channel member.

Preferably, the housing of the apparatus is releasable from connection with the channel member to facilitate loading of a capsule into the housing. In preferred such embodiments wherein the housing is connected to the channel member by a housing support, the housing support facilitates release of the housing from connection with the channel member for loading a capsule into the housing.

Preferably, the housing support is pivotable relative to the channel member to facilitate connection and/or release of the housing with the channel member.

Preferably, the housing support is pivotable from an upright, closed position, to an inclined, open position to facilitate connection and release of the housing with the channel member.

Preferably, the adjustable member of the apparatus is slidable through a channel of the channel member to facilitate penetration of a plant to form an opening in the plant.

Preferably the adjustable member is slidable through a channel of the channel member to facilitate insertion of a capsule from the housing into the plant.

In certain preferred embodiments, sliding of the adjustable member through a channel of the channel member facilitates movement of the housing relative to the channel member to position a capsule for insertion from the housing into the plant.

In preferred embodiments, the adjustable member comprises or is engaged with a plant penetrating end. Preferably, the plant penetrating end is a drilling end. Preferably, the plant penetrating end is capable of passing through the housing and/or the housing support of the apparatus to penetrate a plant.

In preferred embodiments, the adjustable member comprises or is engaged with a capsule insertion end. Preferably, the capsule insertion end is capable of passing though the housing and/or the housing support of the apparatus to obtain a capsule from the housing and insert the capsule from the housing into a plant.

In preferred embodiments, the plant penetrating end of or engaged with the adjustable member is the capsule insertion end of or engaged with the adjustable member.

Preferably, the housing of the apparatus of this aspect is further suitable for containing a closure for closing an opening formed in the plant. In preferred embodiments wherein the housing comprises a plurality of compartments for containing a plurality of capsules for insertion into a plant, said compartments are further capable of containing respective closures.

In preferred embodiments wherein the housing of the apparatus is suitable for containing a closure for closing an opening formed in the plant, preferably, movement of the adjustable member within the channel member facilitates insertion of the closure into an opening formed in the plant to close said opening.

Preferably, the apparatus further comprises one or more plant-engaging protrusions for engagement with a plant. Preferably, the plant-engaging protrusion facilitates alignment of the channel member and/or the adjustable member to the plant, and/or stabilisation of the apparatus with respect to the plant. Preferably, the plant-engaging protrusion is of or connected to the housing and/or housing support of the apparatus. Preferably, the plant-engaging protrusion is in the form of one or more, more preferably a plurality, of pins or spikes.

In embodiments wherein a plant penetrating end of or attached to the adjustable member is capable of passing through the housing and/or housing support of the apparatus, preferably the one or more plant engaging protrusions are arranged around a position of the housing and/or housing support through which the plant penetrating end passes.

Preferably, the apparatus further comprises a handle. Preferably said handle facilitates adjustment of the adjustable member within the channel member. Preferably, said handle is of or connected to the channel member. In an embodiment, the handle may be of or connected to the adjustable member.

Preferably the apparatus of this aspect is engageable with an insertion actuator to facilitate penetration of a plant using the adjustable member. Suitably, the adjustable member is engageable with said insertion actuator. Preferably, said insertion actuator is a drill such as a power drill.

In embodiments, the apparatus of the fourth aspect is for use according to the method of the first aspect.

In preferred embodiments, the housing of the apparatus of the fourth aspect comprises the capsule of the second aspect, or the capsule and/or the closure of the kit of the third aspect.

A fifth aspect of the invention provides a system comprising the apparatus of the fourth aspect engaged with an insertion actuator to facilitate penetration of a plant using the adjustable member. Preferably said insertion actuator is a drill, such as a power drill.

It will be appreciated that the indefinite articles "a" and "an" are not to be read as singular indefinite articles or as otherwise excluding more than one or more than a single subject to which the indefinite article refers. For example, "a" capsule includes one capsule, one or more capsules or a plurality of capsules.

As used herein, unless the context requires otherwise, the words "comprise", "comprises" and "comprising" will be understood to mean the inclusion of a stated integer or group of integers but not the exclusion of any other integer or group of integers.

DETAILED DESCRIPTION OF THE INVENTION

Figure 1:
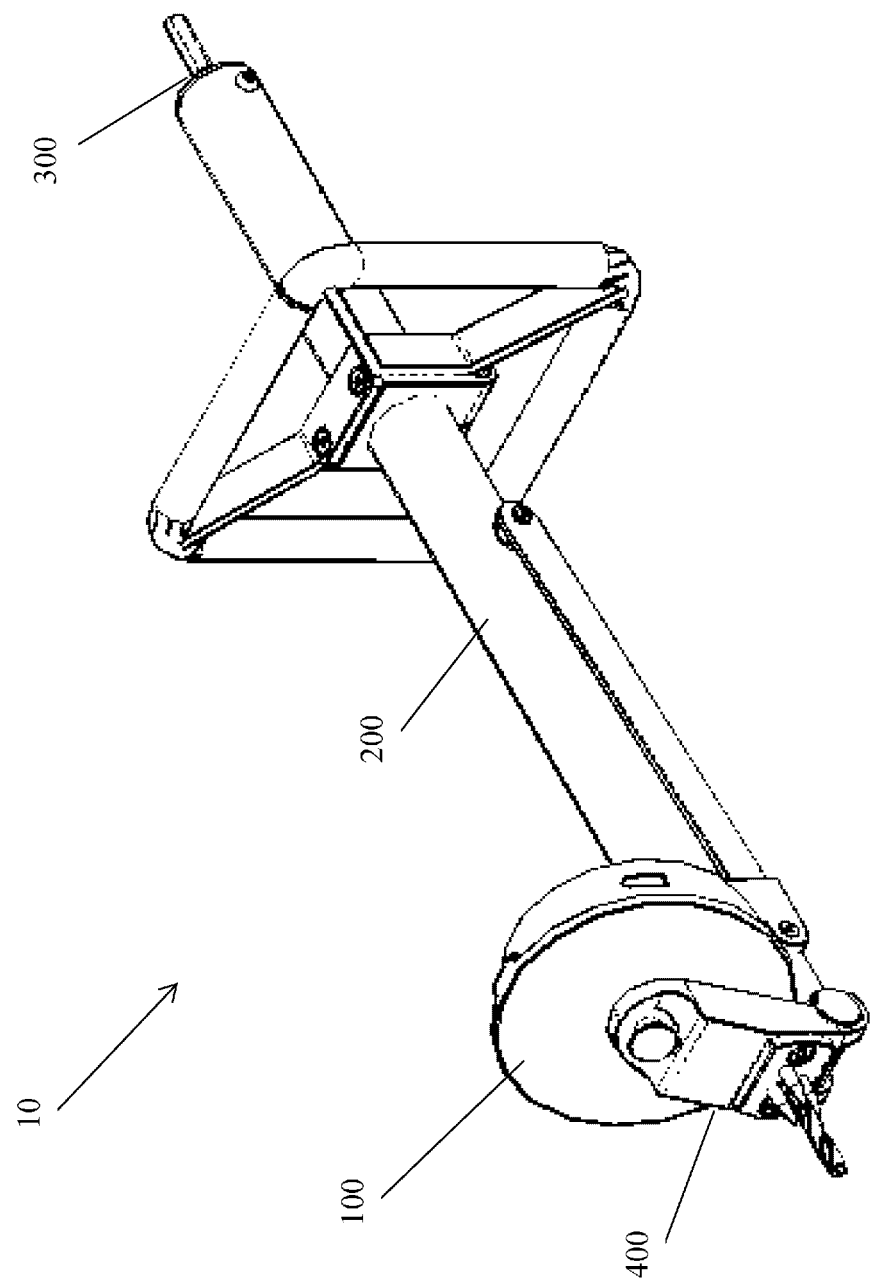
FIG. 1 sets forth a front perspective view of an embodiment 10 of an apparatus for insertion of a capsule into a plant according to the invention.

The present invention is at least partly predicated on the realisation that capsular delivery of agents may have benefits or advantages for regulating the growth of plants. Some embodiments of the invention are at least partly predicated on the realisation that capsular delivery of a chemical herbicide composition into a weed may offer benefits or advantages as compared to existing methods of herbicide delivery, especially in the context of control of woody weeds, such as trees. As explained further herein, such advantages or benefits may include improved safety and/or ease of application; improved accuracy or precision of application; and reduced collateral exposure of the environment to herbicide, as compared to existing methods of herbicide delivery.

Method for Regulating Plant Growth

Accordingly, in one aspect the invention provides a method of regulating growth of a plant, the method including the steps of:

(a) inserting a capsule containing an agent into an opening formed in a plant; and (b) closing the opening formed in the plant into which the capsule is inserted.

As used herein, by "regulating growth of a plant" broadly encompasses modifying or changing the growth and/or development of a plant, including positive regulation, such as increasing or enhancing growth and/or development; and negative regulation, such as decreasing or inhibiting growth and/or development.

As used herein, "regulating growth of a plant" further includes modifying or changing the response of a plant to a stress, including increasing or decreasing the resistance of a plant to a biotic stress such as a bacterial, fungal, viral, or insect-related disease; and increasing or decreasing the resistance of a plant to an abiotic stress such as heat, drought, or salt stress.

Preferably, the plant according to the method of this aspect is a woody plant. As used herein, a "woody plant" is a plant that produces wood as its structural tissue. Woody plants will be understood to include trees, shrubs, and lianas, although without limitation thereto.

In certain preferred embodiments of this aspect, the plant is a weed. As used herein, "weed" broadly includes any undesired plant, for example, a plant growing out of place, or in a place where a different kind of plant or no plant at all is desired.

Preferably, the weed is a woody weed. As will be understood by the skilled person, woody weeds include, for example, rangeland weeds such as *parkinsonia* (*Parkinsonia aculeata*), prickly acacia (*Vachellia nilotica*), African boxthorn (*Lycium ferocissium*), chinee apple (*Ziziphus mauritiana*), calotrope (*Calotrpis procera*), belly-ache bush (*Jatropha gossypiifolia*), mesquite (*Prosopis* spp), *mimosa* bush (*Acacia farnesiana*); and wetland weeds such as Athel pine (*Tamarix aphylla*), mimosa (*Mimosa pigra*), parkinsonia, and willow species (*Salix* spp).

It will be further appreciated that woody weeds can include native species and introduced species. By way of non-limiting example, in Australia, native woody weed species include *Acacia, Angophora, Eucalyptus, Melaleuca*; and introduced woody weeds include lantana (*Lantana camara*), camphor laurel (*Cinnamomum camphora*), broad-leafed pepper tree (*Schinus terebinthifolius*), Chinese *celtis* (*Celtis sinensis*), African tulip tree (*Spathodea campanulata*), broad-leafed privet (*Ligustrum lucidum*), Chinese privet (*Ligustrum sinense*), golden rain tree (*Koelreuteria elegans*), tipuana (*Tipuana tipu*), tree-of-heaven (*Ailanthus altissima*), rubber vine (*Cryptostegia grandiflora*), and castor oil plant (*Ricinus communis*).

In some preferred embodiments, the weed is selected from the group consisting of *Acacia* spp. (wattles); *Acer negudo* (box elder); *Ailanthus altissima* (tree-of-heaven); *Angophora* spp. (e.g. apple); *Atalaya hemiglauc* (whitewood); *Azadirachta indica* (neem); *Banksia* spp. (e.g. bottlebrush); *Bursaria spinosa* (Australian blackthorn); *Caesalpinia decapetala* (thorny poinciana); *Calotropis procera* (rubber bush); *Cascabela thevetia* (yellow *oleander*); *Casuarina* spp. (e.g. she-oak); *Celtis sinensis* (Chinese *celtis*); *Cestrum elegans* (Purple *cestrum*); *Cestrum fasciculatum* (red *cestrum*); *Cestrum nocturnum* (night jasmine); *Cestrum parqui* (green *cestrum*); *Chamaecytisus palmensis* (tree Lucerne); *Cinnamomum camphora* (camphor laurel); *Crataegus sinaica* (azarola); *Coffea Arabica* (coffee); *Cryptostegia grandiflora* (rubber vine); *Eremophila mitchellii* (false sandalwood); *Eriobotrya japonica* (loquat); *Erythrina crista-galli* (cockspur coral tree); *Erythrina sykesii*(coral tree); *Eucalyptus* spp. (e.g. box *eucalypt*); *Eugenia uniflora* (Brazilian cherry); *Fraxinus angustifolia* (desert ash); *Gleditsia triacanthos* (honey locust); *Gmelina elliptica* (badhara bush); *Harungana madagarcariensis* (Harungana); *Ilex aquifolium* (holly); *Inga edulis* (icecream tree); *Jatropha gossypiifolia* (bellyache bush); *Koelreuteria elegans* (golden rain tree); *Lantana camara* (lantana); *Leucaena leucocephala* (leucaena); *Lagunaria patersonia* (Norfolk Island hibiscus); *Leptospermum* spp. (e.g. tea tree); *Ligustrum lucidum* (broad leaf privet); *Ligustrum sinense* (Chinese privet); *Lycium ferocissium* (African boxthorn); *Melaleuca* spp. (*melaleuca*); *Miconia calvescens* (velvet tree); *Mimosa pigra* (*mimosa*); *Olea europea* subsp. *africana* (African olive); *Olea europea* subsp. *europa* (European olive); *Oleander nerium* (oleander); *Parkinsonia aculeate* (parkinsonia); *Paulownia fortune*(paulownia); *Phoenix* spp. (e.g. palm); *Pittosporum undulatum* (sweet *pittosporum*); *Planchonia careya* (cocky apple); *Populus* spp. (poplar); *Prosopis* spp. (e.g. mesquite); *Psidium cattleianum* (cherry guava); *Ricinus communis* (castor oil plant); *Robinia pseudoacacia* (black locust); *Rubus anglocandicans* (blackberry); *Salix* spp. (e.g. willow); *Schefflera actinophyla* (umbrella tree); *Schinus molle* (peppercorn tree); *Schinus terebinthifolius* (broad-leafed pepper tree); *Senegalia catechu* (cutch tree);

*Senna occidentalis* (coffee *senna*); *Senna pendula* (winter *senna*); *Senna septemtrionis* (smooth *senna*); *Solanum mauritianum* (wild tobacco tree); *Spathodea campanulata* (African tulip tree); *Syagrus* spp. (e.g. palm); *Tabebuia aurea* (*tabebuia*); *Tamarix aphylla* (Athel pine); *Tipuana tipu* (*tipuana*); *Toxicodendron succedaneum* (*rhus*); *Triadica sebifera* (Chinese tallow tree); *Vachellia farnesiana* (*mimosa* bush); *Vachellia karroo* (karoo thorn); *Vachellia nilotica* (prickly *acacia*); and *Ziziphus mauritania* (Chinese apple).

In embodiments wherein the plant is a weed, regulating growth of the plant according to the method of this aspect is suitably in the form of inhibiting growth of the weed. As used herein, by "inhibiting growth of a weed" is meant interfering with the normal growth and development of a weed, including inducing or contributing to death of the weed and/or killing the weed. In some embodiments, this may include killing trees, 'thinning' tree populations, and/or partial deforestation of land such as grazing or other agricultural land.

Interference with the normal growth and development of a weed, including inducement or contribution to the death of the weed, can be assessed using methods well known to one of skill in the art. For example, weeds that are stressed may exhibit symptoms including, but not limited to, changes in foliage colouration (e.g., from green to yellow and/or brown), leaf loss, shoot tip damage, branch and/or shoot death, bare stems and/or branches, stem and/or branch splitting, and loss of bark.

As noted above, it has been recognised that capsular delivery of chemical herbicide, or more particularly placing a capsule containing a herbicide composition within an opening formed in a weed, may be associated with various benefits or advantages as compared to other herbicide application methods for controlling the growth of the weed.

For example, conventional application of chemical herbicides to weeds uses compositions, such as liquid compositions, in a manner in which there is a significant risk of contact of the chemical herbicide with a user applying the herbicide. As such, substantial personal protective equipment (PPE) must be worn by the user when preparing and applying the herbicide.

In the particular case of spraying applications, the application is typically relatively non-specific and imprecise. Furthermore, for these and other conventional application methods wherein the applied herbicide is located on the exterior of the tree and therefore exposed to the environment, there is a risk of environmental contamination and water or rain-fastness is a consideration. The external conditions (e.g. dryness) and condition of the weed treated (e.g. composition of the wood or bark) can also affect the degree to which the herbicide applied will be absorbed into or otherwise taken up by the weed, which may influence effectiveness of the control of weed growth.

Conventional cut-stump application methods, as hereinbefore described, can ameliorate difficulties associated with specificity and/or precision, however possible transfer of the applied herbicide to the environment remains a substantial issue, and these methods are also associated with risks due to the use of a relatively hazardous equipment (e.g. chainsaw or brush cutter), and falling weeds, particularly in the case of large woody weeds such as trees. Furthermore, although conventional stem injection methods may ameliorate issues associated with exposure of the herbicide to the external environment, use of liquid chemical herbicide compositions in this context requires PPE as noted above.

In certain embodiments of the method of this aspect, the plant is a cultivated plant. As used herein, a "cultivated plant" broadly includes any plant intentionally grown and/or maintained by a human, for example, garden plants, crop plants, amenity plants, and produce plants. Preferably, the cultivated plant is a woody cultivated plant.

In certain particularly preferred embodiments, the cultivated plant is selected from the group consisting of a *Eucalyptus* species, such as *Eucalyptus pilularis* (blackbutt), *Eucalyptus dunnii* (Dunn's white gum), *Eucalyptus grandis* (flooded gum), *Eucalyptus globulus* (blue gum), *Eucalyptus nitens* (shining gum); *Eucalyptus argophloia* (Queensland western white gum); and *Eucalyptus saligna* (Sydney blue gum); an *Araucaria* species, such as *Araucaria cunninghamii* (hoop pine); a *Pinus* species, such as *Pinus pinaster* (maritime pine), *Pinus radiata* (*radiata* pine), *Pinus caribaea* (Caribbean pine), and *Pinus elliottii* (slash pine); a *Corymbia* species such as Corymbia *maculata* (spotted gum); a *Cupressus* species, such as *Cupressus macrocarpa* (Monterey cypress); a *Pseudotsuga* species, such as *Pseudotsuga menziesii* (Douglas fir); a *Populus* species, such as *Populus tremula* (aspen); a *Flindersia* species, such as *Flindersia brayleyana* (Queensland maple); and *Grevillea* species, such as *Grevillea robusta* (silky oak), or hybrids including one or more of said species.

In some embodiments wherein the plant is a cultivated plant, the cultivated plant may be a tree grown in a plantation wherein an excess of individual trees are planted. It will be appreciated that in such embodiments, the cultivated plant may also be considered a weed. Suitably, in such embodiments, the cultivated plant may be subject to inhibition of growth as hereinabove described.

In preferred embodiments wherein the cultivated plant is a tree, or other suitable plant, grown in a plantation wherein an excess of individual trees, or other suitable plants, are planted, the method of this aspect will be applied after individual plants in the plantation have expressed one or more suitable growth characteristics (such as size, shape, colour, branching pattern, etc.). Preferably, undesirable individuals will be selected based on said expression of characteristics.

It will be further be appreciated that in some embodiments wherein the plant is a cultivated plant, an agent as herein described may be applied to the plant to increase or enhance growth and/or development of the plant. Additionally or alternatively, an agent may be applied to a cultivated plant to increase or enhance resistance to a biotic and/or abiotic stress.

In certain embodiments, an agent may be applied to a cultivated plant to increase disease or pest resistance. Similarly, an agent may be applied to a cultivated plant to prevent and/or treat a disease or infestation of the cultivated plant.

According to the method of this aspect, the opening into which the capsule is inserted may have any suitable characteristics and may be formed in any suitable manner. It will be further appreciated that, in some preferred embodiments, a plurality of openings may be formed in the plant. For example, two, three, four, five, or more openings may be provided in a plant. The number of openings formed in the plant may depend on the circumference of a stem or trunk of the plant or a limb or branch of the plant. For example, for a plant with a narrow stem it may desirable to form three or fewer openings (e.g., two or one), while for a plant with a larger stem it may be desirable to form more openings, for the purposes of the method of this aspect.

Suitably, in embodiments wherein a plurality of openings are formed in the plant, a capsule may be inserted in each of the openings. It will be further understood that a plurality of capsules may be inserted into a single opening formed in the plant.

The one or more openings into which the one or more capsules containing the agent are placed according to the method of this aspect may be formed in any suitable portion of the plant. In preferred embodiments, at least one of the one or more openings in the plant are formed in a stem or trunk, or limb or branch of the plant.

It is particularly preferred that at least one of the one or more openings formed according to the method of this aspect is formed in the stem or trunk of the plant. In the context of weed control, insertion of a capsule containing a herbicide composition into an opening formed in a stem of the weed according to the method of this aspect is considered most effective for controlling weed growth. This is at least in part because herbicide inserted into the stem, as the main aboveground structural axis of the weed, is typically expected to be most appropriate for achieving a substantial systemic effect on growth of the weed. Similar considerations may apply in relation to the application of other agents to other plants.

It will be further appreciated that the openings for insertion of the capsule according to the method of this aspect may be formed at any suitable position within the stem or trunk, or within a limb or branch, of the plant. In certain embodiments, at least one of the one or more openings may be positioned substantially in the centre of the stem or limb. In some embodiments, a 'ring' of multiple openings may be positioned around a circumference of a plant stem or limb, or both.

Openings may be formed at any height in the stem or limb of the plant. In some embodiments, openings may be formed in the plant at a height less than or equal to 2 m, 1.5 m, or 1 m above soil level. In some preferred embodiments openings are formed at a height of less than or equal to 90 cm, 80 cm, 70 cm, 60 cm, 50 cm, 40 cm, 30 cm, 20 cm, 10 cm, or 5 cm above soil level. In some embodiments, two or more openings, or two or more rings of openings, may be formed in a plant at different heights. It will be appreciated that in embodiments wherein two or more rings or openings are formed in a plant at different heights, the openings in a first ring may be offset from the openings in a second ring so that one or more of the first ring openings are not positioned vertically in line with the openings of the second ring.

Openings formed in a plant according to the method of this aspect may extend in the plant to a depth from about 5 mm to about 100 mm, including about 15 mm; 20 mm; 25 mm; 30 mm; 35 mm; 40 mm; 45 mm; 50 mm; 55 mm; 60 mm; 65 mm; 70 mm; 75 mm; 80 mm; 85 mm; 90 mm; and 95 mm. In some preferred embodiments the openings formed in the plant have a depth of about 10 mm to about 50 mm.

The openings may extend into a plant at any angle, such as from about 00 to about 180° relative to an axis parallel to a plant stem or branch in which the opening is formed, including about: 10°; 20°; 30°; 40°; 50°; 60°; 70°; 80°; 90°; 100°; 110°; 120°; 130°; 140°; 150°; 160°; and 170°. Multiple openings formed in a plant may extend in the plant at substantially the same angle, or the openings may be formed at different angles.

Openings in the plant may have various cross-sectional shapes, such as substantially rectangular, substantially square, substantially oval, or irregular. In some embodiments, an opening may have a substantially circular cross-sectional shape.

In preferred embodiments, the opening formed in the plant has a diameter or width of between about 2 mm to about 30 mm, including about: 3 mm; 4 mm; 5 mm; 6 mm; 7 mm; 8 mm; 9 mm; 10 mm; 11 mm; 12 mm; 13 mm; 14 mm; 15 mm; 16 mm; 17 mm; 18 mm; 19 mm; 20 mm; 21 mm; 22 mm; 23 mm; 24 mm; 25 mm; 26 mm; 27; mm; 28 mm; and 29 mm. Preferably, the diameter or width of the opening is between about 4 mm to about 15 mm.

Suitably, the one or more openings can be formed according to the method of this aspect by penetration of the plant. The penetration may be by way of wounding the plant, for example, using an awl, a nail, a blade, or other suitable object. The penetration may also be by way of driving, vibrating, rotating, and/or impacting a device (e.g., a punch, awl, nail, screw, blade, or other suitable object) into the plant. Suitably, an object used to penetrate the plant may be removed after formation of the opening. In particularly preferred embodiments of this aspect, the one or more openings are formed by drilling. It will be readily appreciated that drilling to form openings in a plant will typically be by way of use of a drilling tool, such as a power drill, tree borer, and/or manually operable drill.

In embodiments wherein the plant is a woody plant, it is particularly preferred that an innermost end of at least one of the one or more openings is located in sapwood of the plant. It is further particularly preferred according to this aspect that at least one of the one or more capsules inserted into the plant is located within sapwood of the plant. Preferably, all of the capsules are located within the sapwood of the plant.

As will be readily understood by the skilled person, "sapwood" refers to the outermost wood of woody plants, typically located between inner hardwood and outer bark. Sapwood is younger, living wood containing xylem and phloem vessels. In at least certain embodiments, locating capsules within the sapwood of the plant is considered particularly desirable according to this aspect, as an agent, such as a herbicide, released from the capsule is expected to be transported systemically by xylem and/or phloem. Such systemic transport is considered beneficial for achieving a substantial effect of the agent on the growth of the plant.

As used herein, the "capsule" inserted into an opening formed in a plant according to the method of this aspect will be understood to encompass any sealed or sealable container, enclosure or vessel suitable for insertion into a plant, such as a woody plant, and capable of delivery of a suitable agent to the plant.

As set forth above, it has been recognised for the invention that the use of encapsulated chemical herbicide compositions can be associated with particular benefits in the context of controlling the growth of a weed by placing or inserting chemical herbicide composition into the weed. For example, this can reduce the risk of exposure or contact of a user with active herbicidal chemicals. The use of encapsulated herbicides may additional or alternatively facilitate relatively precise or accurate herbicide dosing to the weed according to the method of this aspect. Furthermore, encapsulation of the herbicide may allow for controlled release into a weed. Similar considerations may apply in the context of the application of other agents, such as pesticides, fertilisers, and growth stimulants, to plants, such as cultivated plants.

It will be understood that the capsule used according to the method of this aspect may be of any suitable shape, and may be of any suitable size and/or volume.

Shape properties of capsules according to the method of this aspect may be at least partially determined or influenced by the shape of the opening formed in the plant; and/or the manner by which the capsule is to be inserted into the plant, according to the method of this aspect. By way of non-limiting example, in certain embodiments a capsule with smooth, circular, rounded, and/or cylindrical outer surface may be desirable for insertion into an opening formed in the plant, such as a substantially cylindrical opening formed by drilling.

Size and/or volume properties of capsules according to the method of this aspect may be at least partially determined by the size of the plant; the size of the opening formed in the plant; and/or the dosage requirements for the agent.

In some preferred embodiments, the capsule may have at least one dimension of about 5 mm to about 50 mm, including about: 10 mm; 15 mm; 20 mm; 25 mm; 30 mm; 35 mm; 40 mm; and 45 mm. Preferably, said at least one dimension is between about 10 mm and about 30 mm. In some embodiments said dimension is a length or height.

In some preferred embodiments, the capsule may have at least one dimension of about 1 mm to about 30 mm, including about: 1 mm; 2 mm; 3 mm; 4 mm; 5 mm; 10 mm; 15 mm; 20 mm; and 25 mm. Preferably, said at least one dimension is between about 4 mm and about 10 mm. In some embodiments said dimension is a width or thickness.

In some preferred embodiments, the capsule has a volume of about 40 cubic mm to about 40 cubic cm. Preferably, the capsule has a volume of between about 0.05 cubic cm to about 10 cubic cm, including about 0.1; 0.2; 0.3; 0.4; 0.5; 1; 1.5; 2; 2.5; 3; 3.5; 4; 4.5; 5; 5.5; 6; 6.5; 7; 7.5; 8; 8.5; 9; and 9.5 cubic cm. More preferably, the capsule has a volume of about 0.1 cubic cm to about 2 cubic cm.

In preferred embodiments, the capsule is a soluble capsule. Preferably, the capsule is water-soluble. It will be appreciated that when placed within a plant according to the method of this aspect, upon exposure to water or aqueous fluid such as xylem or phloem, a water-soluble capsule containing an agent will substantially dissolve, releasing the agent into the plant.

In preferred embodiments, the water-soluble capsule is formed from or comprises a material selected from the group consisting of water soluble alginate; polysaccharide; cellulose; polyethylene glycol, or derivatives thereof. Additional soluble materials and methods of preparing soluble capsules are known in the art and are described, for example, in *Remington: The Science and Practice of Pharmacy Pharmaceutical Sciences*, Lippincott Williams and Wilkins (A. R. Gennaro editor, 20$^{th}$ edition), incorporated herein by reference.

The agent contained within the capsule according to the method of this aspect may take any suitable form. Suitably, the agent will be capable of regulating plant growth, as hereinabove defined. The agent may be of a composition.

In certain preferred embodiments, the agent is a chemical agent.

It will be understood that for the purposes of this invention, a "chemical agent" is distinguished from a biological agent capable of regulating plant growth. The skilled person will appreciate that certain biological agents, such as fungi, bacteria, and viruses, are capable of regulating plant growth. Said biological agents include agents that can increase or enhance plant growth and/or development, such as mycorrhizal fungi. Said biological agents also include biological agents that can decrease or inhibit plant growth and/or development.

As will be understood by the skilled person, biological agents that can decrease or inhibit plant growth and/or development may be referred to as 'biocontrol' agents. Typically, biocontrol agents exert an effect on plant growth by infecting, infesting, or otherwise colonising the plant. Additionally or alternatively, biocontrol agents may themselves produce chemical agents in situ which control plant growth.

Regardless of the mode of action, biological agents will not be considered chemical agents for the purpose of this invention. Neither will chemical agents that are produced by or derived from biological agents in situ upon insertion of a capsule containing the biological agent into an opening of a plant be considered chemical agents, for the purpose of this invention. For the sake of clarity however, chemical agents corresponding to said agents may be considered chemical agents if they are administered directly, rather than produced by a biological agent in situ.

It will also be understood that compositions of the invention comprising chemical agents do not necessarily exclude biological agents. That is, in some embodiments the composition may comprise a biological agent in addition to a chemical agent. In certain preferred embodiments however, the composition comprises a chemical agent and is free of, or substantially free of, biological agents.

In preferred embodiments wherein the plant is a weed, the agent is a chemical herbicide. "Chemical herbicide" refers generally to any chemical agent capable of inhibiting or otherwise negatively altering or affecting the growth of a plant, such as a weed.

As will be readily understood by the skilled person, chemical herbicides include synthetic herbicides and organic herbicides. In preferred embodiments, the chemical herbicide is a synthetic herbicide. Non-limiting examples of synthetic herbicides include 2,4-D; aminopyralid; atrazine; clopyralid; dicamba; diuron; glufosinate ammonium; fluazifop; fluroxypyr; glyphosate; hexazinone; imazapyr; imazapic; imazamox; linuron; MCPA; metsulfuron-methyl; metolachlor; paraquat; pendimethalin; picloram; sodium chlorate; sulfonylureas; tebuthiuron; and triclopyr.

It is particularly preferred according to the method of this aspect that the chemical herbicide is or includes an active agent selected from the group consisting of diuron, glyphosate, hexazinone, imazapyr, metsulfuron-methyl, picloram, tebuthiuron, or triclopyr.

In certain preferred embodiments, the composition is or includes two or more of said active agents.

The skilled person will readily appreciate that chemical herbicides may be "selective" herbicides, which are designed to control growth of certain weeds but to not substantially affect the growth of other plant types, or "nonselective" herbicides which are designed to broadly control plant growth. The chemical herbicide according to this aspect may be selective or non-selective.

It will be further understood that particular herbicides may vary in activity or effect for controlling growth of particular weeds. Accordingly, a chemical herbicide for use according to the method of this aspect may be suitably chosen on the basis of the weed or weeds to be controlled.

Table 1, below, sets forth the effectiveness of dicamba, diuron, glyphosate, hexazinone, imazapyr, metsulfuron-methyl, picloram, tebuthiuron, triclopyr for control of growth of a variety of preferred weeds. In some preferred embodiments, the chemical herbicide composition according to the method of this aspect is a chemical herbicide effective for controlling growth of the weed as defined in Table 1. The skilled person will further readily appreciate that for any chemical herbicide and/or weed of interest, assessment of the effectiveness of the chemical herbicide on the weed can be performed by techniques common to the art, e.g. by way of 'test application' of the herbicide to the weed by any of a range of methods known to those skilled in the art.

In certain embodiments wherein the plant is a cultivated plant, the agent may be selected from the group consisting of a growth stimulant; a fertiliser or nutrient; and a pesticide such as an insecticide, a fungicide, an antibacterial agent, and an antiviral agent.

In some preferred embodiments, the agent is a pesticide selected from the group consisting of an organophosphate, such as acephate and potassium phosphonate; a neonicotinoid, such as imidacloprid; a benzoate, such as emamectin benzoate; and an anti-bacterial agent, such as oxytetracycline and streptomycin.

In some preferred embodiments, the agent is a hormonal growth stimulant. The hormonal growth stimulant may include any suitable plant hormone, such as an auxin, a cytokinin, a jasmonate, a salicylate, ethylene, a gibberellin, and an abscisic acid (although without limitation thereto).

In some preferred embodiments, the agent is a fertiliser comprising one or more plant elements selected from the group consisting of nitrogen, phosphorus, potassium, iron, magnesium, copper, zinc, boron, and molybdenum.

In preferred embodiments of this aspect, the agent or composition contained by the capsule is in solid form. Suitably, the solid agent or composition may be in powder or granular form.

It has been recognised that solid agents or compositions, especially those in powder or granular form, may have particular benefits in the context of the invention. For example, solid agents or compositions may be relatively light weight and/or contain a high active ingredient to weight ratio, as compared, for example, to liquid agents or compositions. Furthermore, solid agents or compositions may be relatively stable as compared, for example, to liquid agents or compositions.

Closing of the opening formed in the plant into which the capsule is inserted according to the method of this aspect may be performed in any suitable manner. By way of non-limiting example, closure may be performed by wrapping the opening, e.g., using parafilm or cling wrap; placing a flowable agent within the opening and allowing the agent to set; or placing a solid closure or plug in the opening.

Preferably, the opening is closed using a solid closure or plug. In preferred such embodiments, the plug is formed from or comprises a material selected from the group consisting of metal; wood or cork; plastic; and natural or synthetic rubber. The plug may be an elastomer, inclusive of natural and synthetic elastomers. In a particularly preferred embodiment, the plug is, or comprises, polypropylene. Suitably, the plug is insoluble, preferably water-insoluble.

In some embodiments, closure is by way of injecting a settable, semi-liquid or otherwise flowable agent into the opening, and allowing the agent to set. Exemplary agents that may be used according to these embodiments include settable fillers such as manufactured by Selleys™, e.g. 'No More Gaps' fillers, and similar settable fillers. The settable filler may contain an alkyl halide. The settable filler may contain silicone.

Capsules and Kits

Another aspect of the invention provides a capsule containing an agent suitable for, for, or when used for insertion into a plant to regulate the growth of the plant. Preferably, the plant is a woody plant. In an embodiment, the plant is a weed. In an embodiment, the plant is a cultivated plant.

In preferred embodiments, the capsule is as described for the preceding method of regulating growth of a plant. The capsule provided by the invention may be suitable for use, for use, or when used for said method.

Another aspect of the invention provides a kit comprising a capsule containing an agent; and a solid plug or closure, wherein the kit is suitable for, for, or when used for insertion of a capsule into an opening formed in a plant, and closure of the opening in the plant. In preferred embodiments, the capsule and solid plug are as described for the preceding method. The kit may be suitable for use, for use, or when used, for said method.

Apparatus for Insertion of a Capsule into a Plant

A further aspect of the invention provides an apparatus suitable for, for, or when used for insertion of a capsule into a plant. Preferably, the plant is a woody plant. In some preferred embodiments, said plant is a weed. In some preferred embodiments, said plant is a cultivated plant.

It will be appreciated that, in certain preferred embodiments, the apparatus provided is suitable for, for, or when used for the above described method of regulating growth of a plant. However, it will be understood that the apparatus is not so limited and may be used for any suitable application.

In particular, it will be appreciated that the apparatus of this further aspect may be suitable or desirable for insertion of capsules containing one or more agents into any plant. Typically, the plant will be a woody plant, such as a tree, shrub, or liana. The agents contained in capsules for insertion into a plant using the apparatus of this aspect may be chemical agents or biological agents, or compositions thereof. Chemical agents may be as hereinabove described. Biological agents may be biofertilisers as are known in the art, or biocontrol agents e.g. capsules as described in Australian patent 2009201231.

By way of non-limiting example, an apparatus of this aspect may be used for insertion of a capsule containing an agent such as a nutritional agent (such as a plant fertiliser), or a pesticide (such as a fungicide or insecticide) into an amenity or crop tree, shrub, or liana. An apparatus of this aspect may also be used for administration of capsules containing biological agents, such as biofertilisers as are known in the art, or biocontrol agents e.g. capsules as described in Australian patent 2009201231.

A related aspect provides a method of insertion of a capsule into a plant, such as a woody plant, using an apparatus of this aspect.

FIGS. 1-7 show a preferred embodiment 10 of the apparatus of this aspect. Apparatus 10 comprises:

housing 100 for containing a capsule for insertion into a plant;

channel member 200 connected to housing 100; and adjustable member 300 extending within channel member 200.

Figure 8:
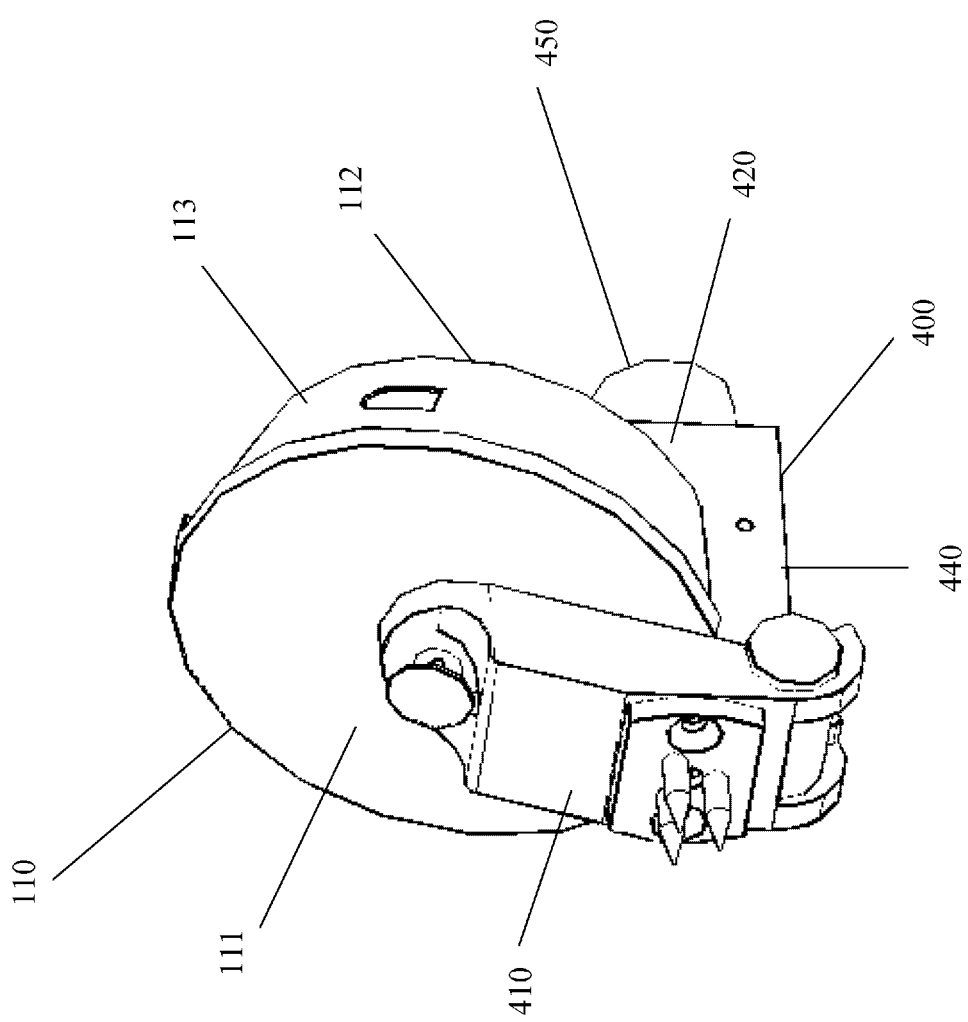
FIG. 8 sets forth a front perspective view of housing 100 connected to housing support 400 of the apparatus of FIG. 1, wherein housing support 400 is in a closed, upright position.
Figure 9:
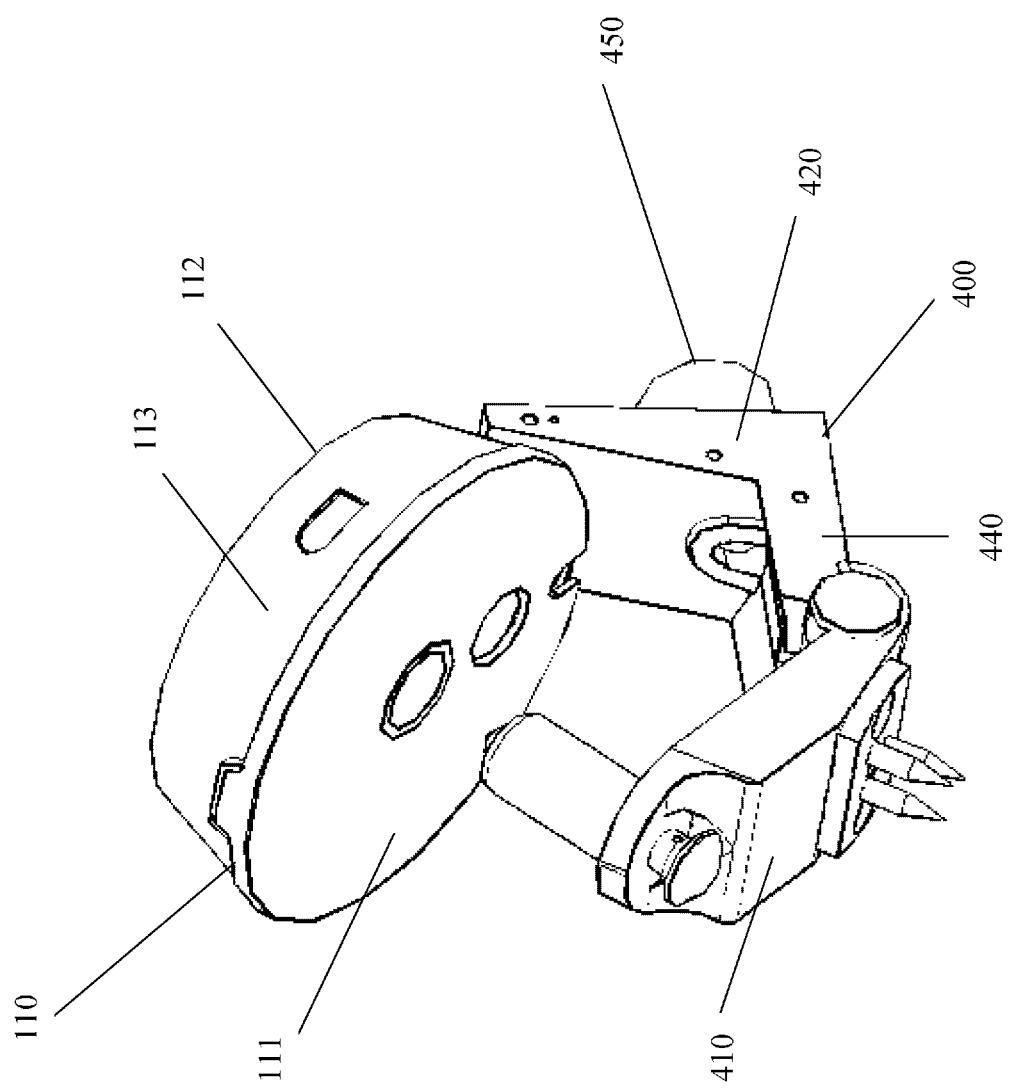
FIG. 9 sets forth a front perspective view of housing 100 released from housing support 400 of the apparatus of FIG. 1, wherein housing support 400 is in an open, inclined position.
Figure 10:
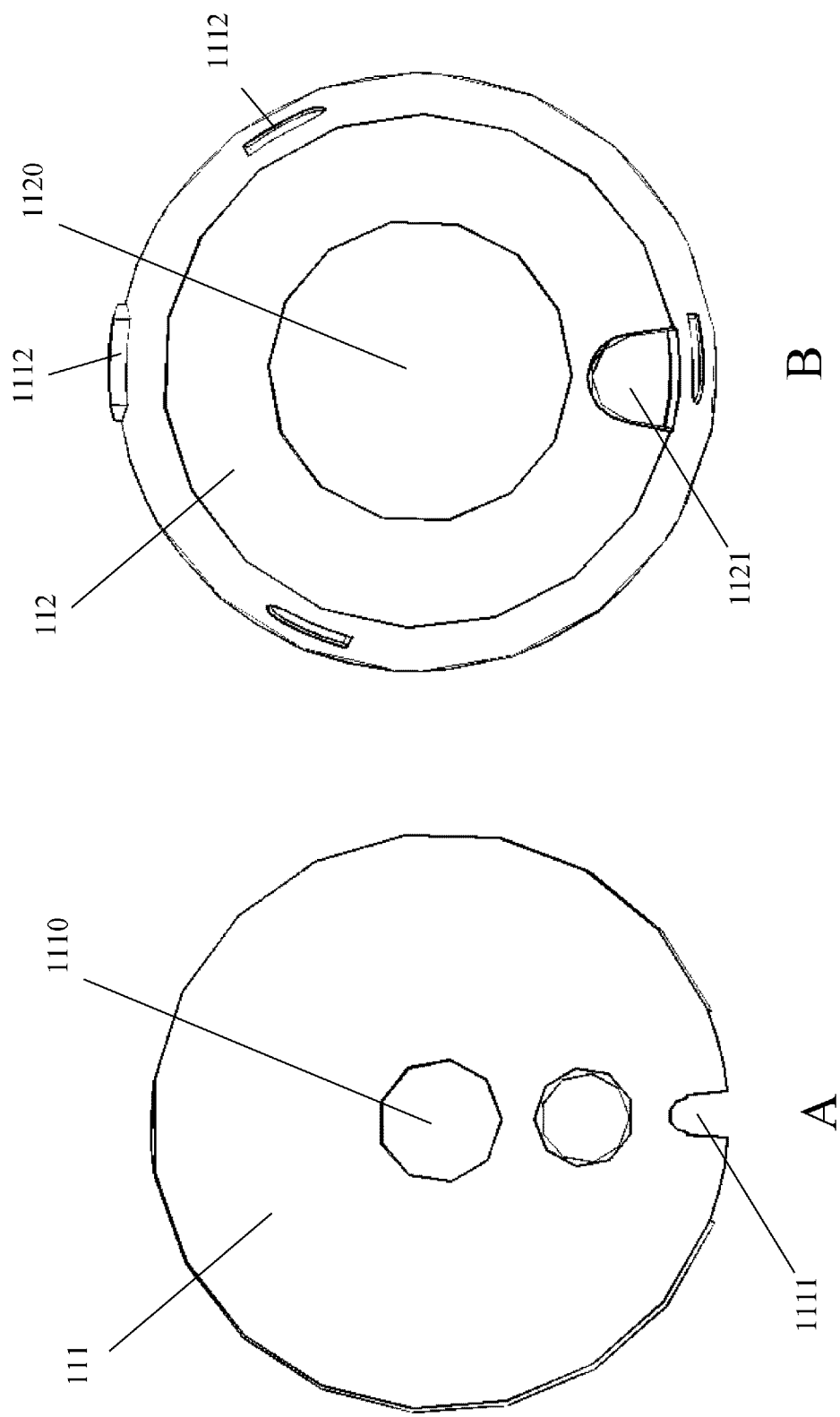
FIG. 10 sets forth front (A) and rear (B) views of housing case 110 of housing 100 of the apparatus of FIG. 1.

Housing 100 is substantially cylindrical in shape. As best seen in FIGS. 8-10, housing 100 comprises housing case 110; and housing body 120 located within housing case 110.

As best seen in FIGS. 8-10, housing case 110 comprises first housing case face 111; second housing case face 112; and housing case side 113. First housing case face 111 and second housing case face 112 comprise respective central apertures 1110 and 1120; and peripheral apertures 1111 and 1121.

As depicted in the figures, housing case side 113 and housing case second face 112 are in fixed connection. As best seen in FIG. 10, housing case face 111 is releasably engaged with housing case side 113 by a clip-tab arrangement 1112. It will be appreciated, however, that any suitable releasable connection arrangement may be used.

Figure 11:
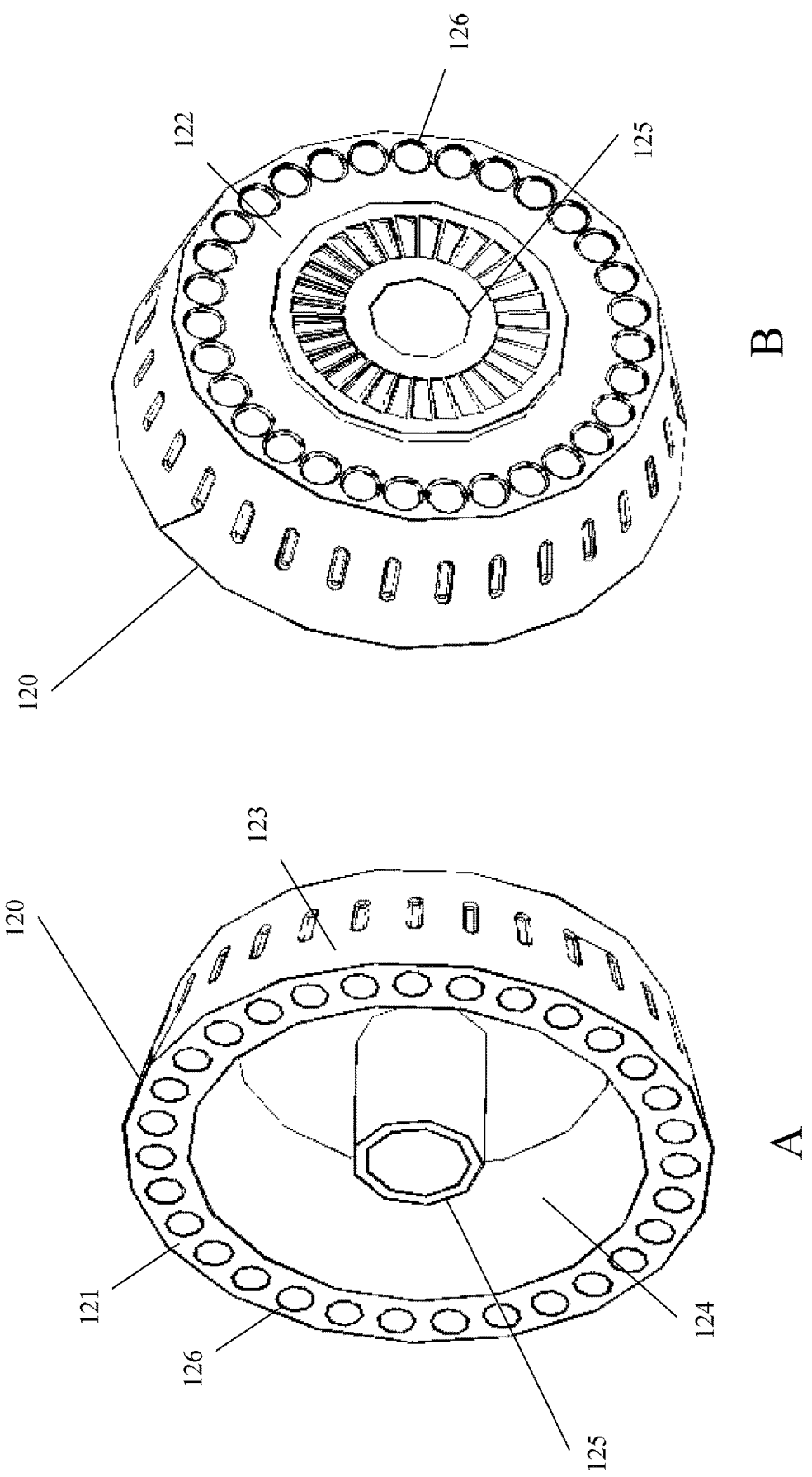
FIG. 11 sets forth front perspective (A) and rear perspective (B) views of housing body 120 of housing 100 of the apparatus of FIG. 1.

As best seen in FIG. 11, housing body 120 comprises housing body rim 121; housing body face 122; housing body outer side 123; and housing body inner side 124. Housing body 120 further comprises central channel 125 extending from housing body face 122 towards a position centrally inwards from housing body rim 121; and capsule channels 126 spaced between housing body outer side 123 and housing body inner side 124 and extending between housing body face 122 and housing body rim 121.

Figure 2:
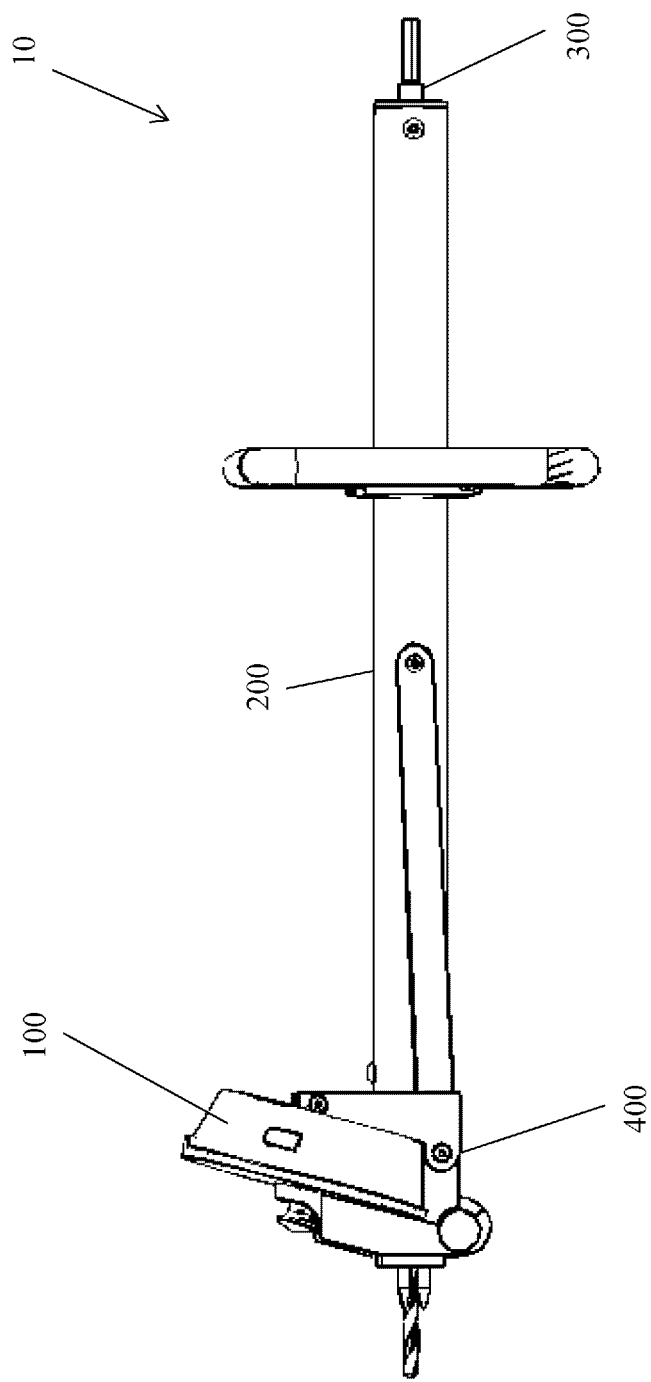
FIG. 2 sets forth a side view of the apparatus of FIG. 1.
Figure 3:
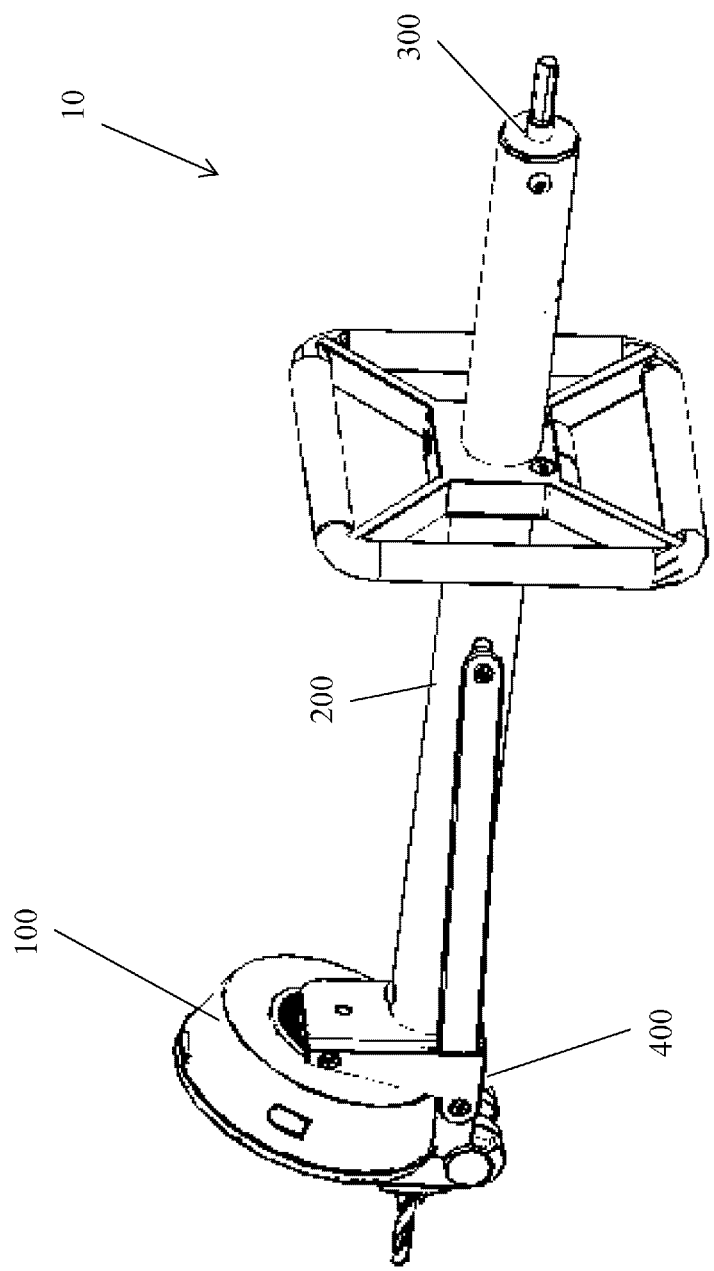
FIG. 3 sets forth a rear perspective view of the apparatus of FIG. 1.
Figure 4:
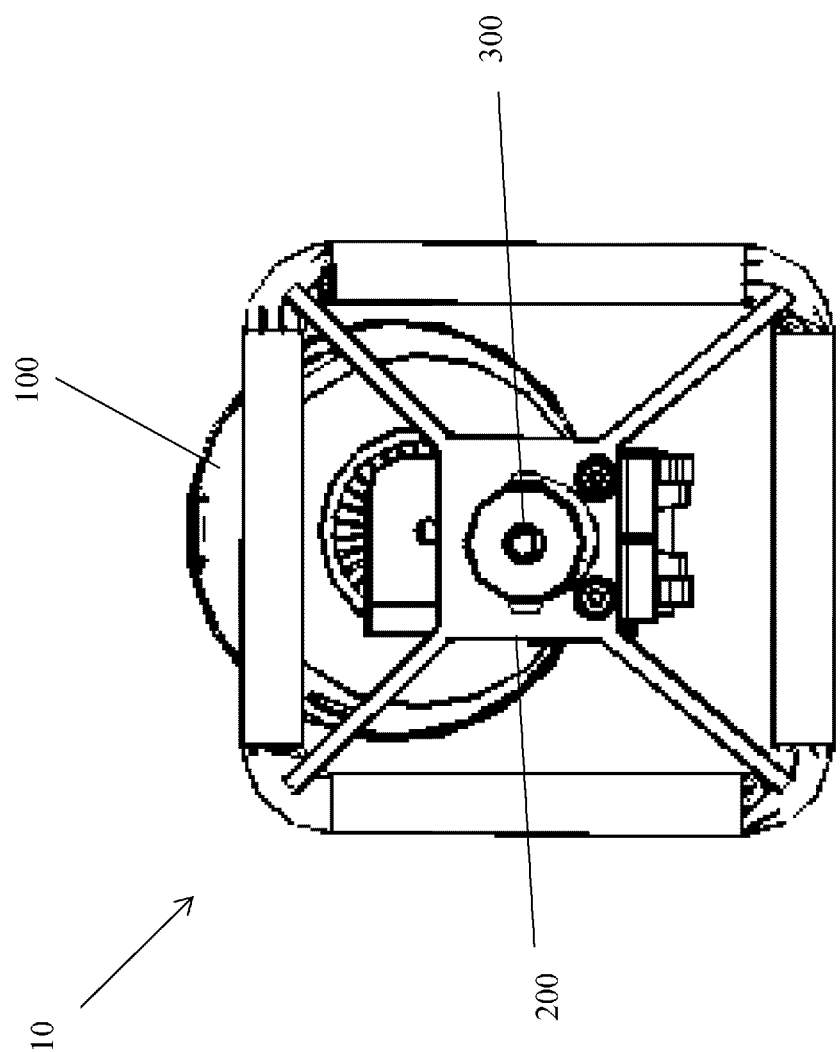
FIG. 4 sets forth a rear view of the apparatus of FIG. 1.
Figure 5:
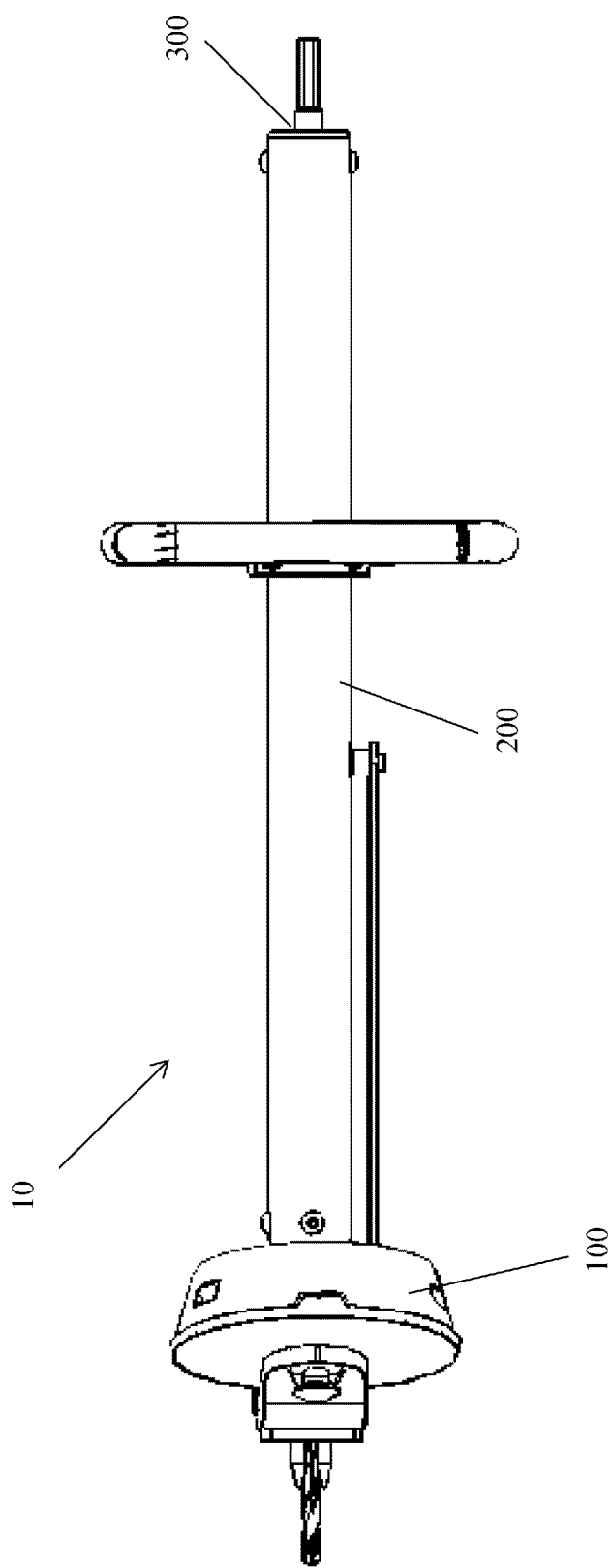
FIG. 5 sets forth a top view of the apparatus of FIG. 1.
Figure 6:
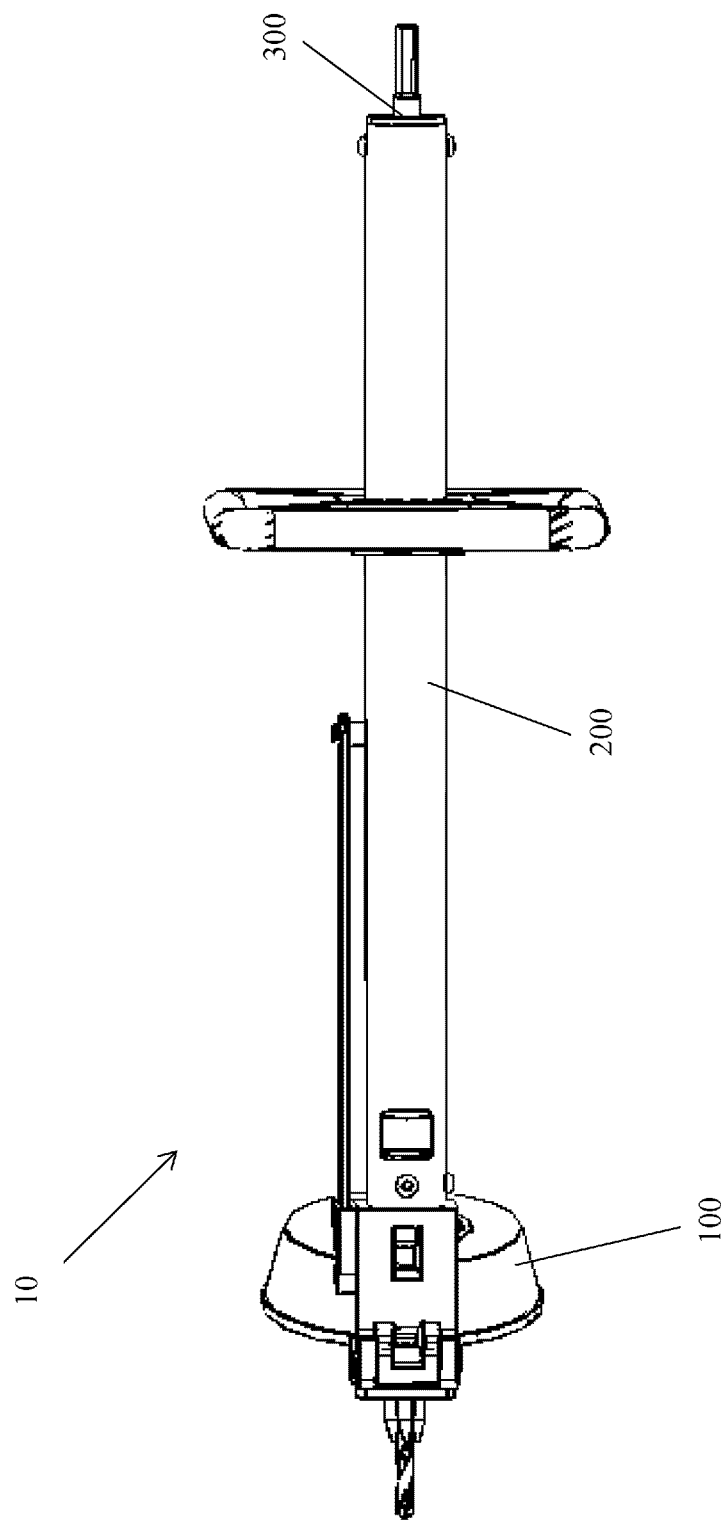
FIG. 6 sets forth a bottom view of the apparatus of FIG. 1.
Figure 7:
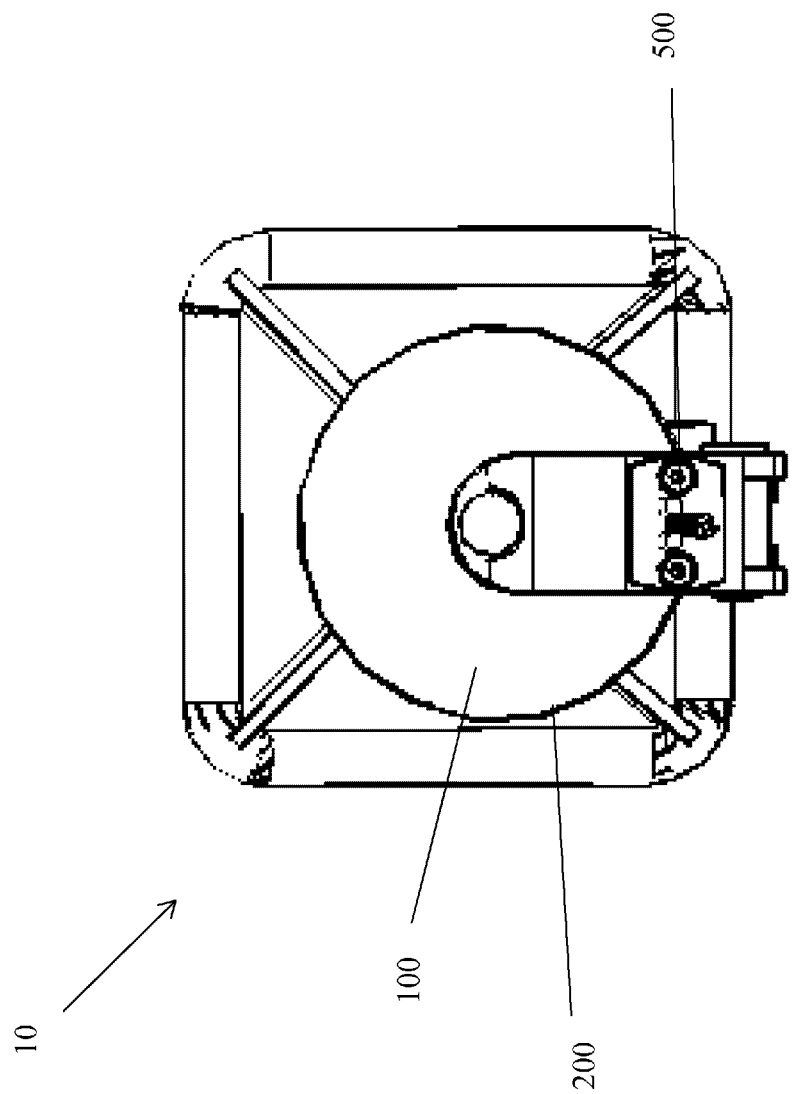
FIG. 7 sets forth a front view of the apparatus of FIG. 1.
Figure 12:
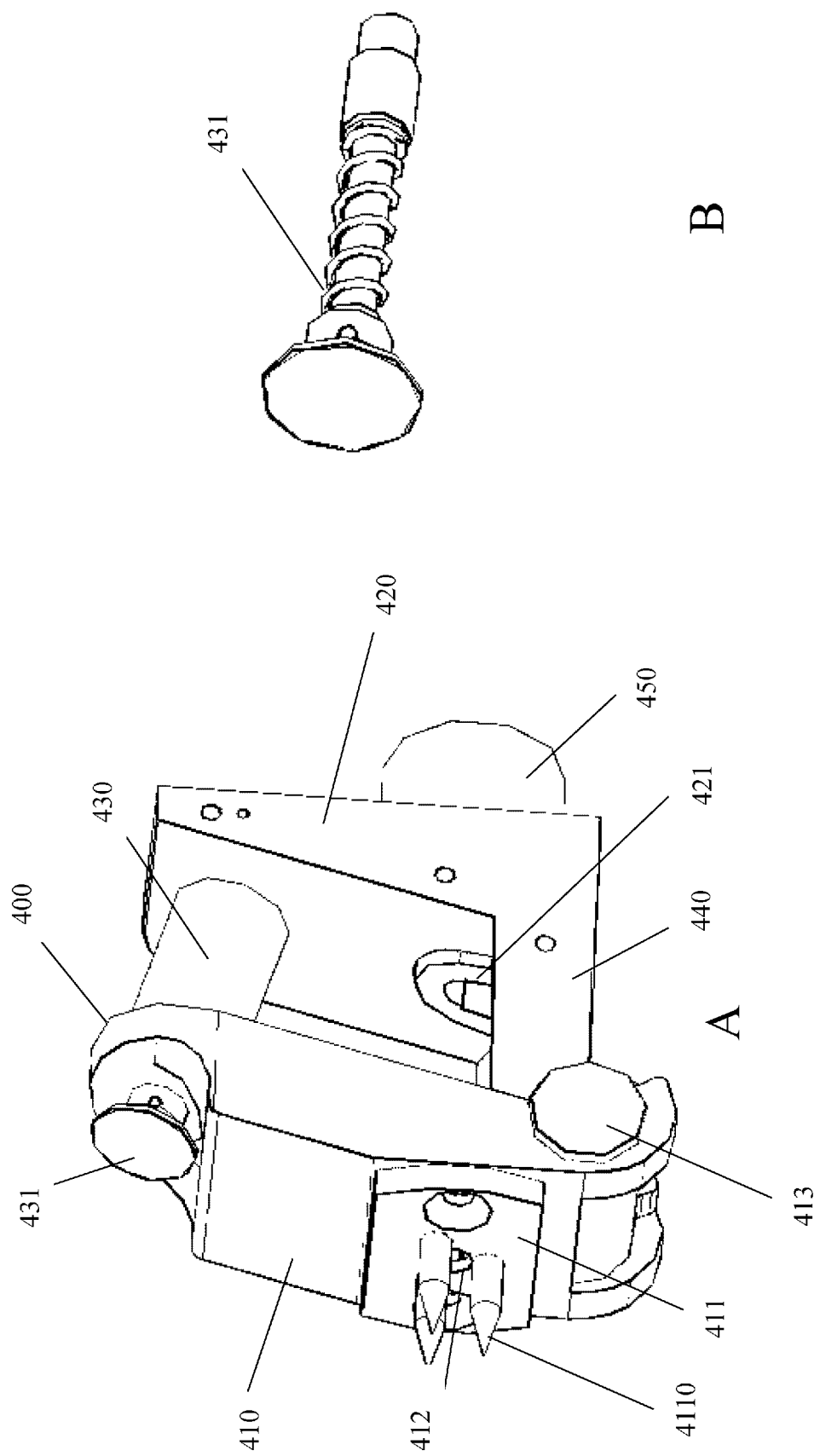
FIG. 12 sets forth (A) a front perspective view of housing support 400 and (B) a front perspective view of pin 431 of housing support 400 of the apparatus set forth in FIG. 1.

Referring to FIGS. 1-3, housing 100 and channel member 200 are connected by housing support 400. As best seen in FIG. 12A, Housing support 400 comprises first support arm 410; second support arm 420; support shaft 430; support base 440; and support connection channel 450.

With reference to FIGS. 8 and 12A, support shaft 430 passes through central channel 125 of housing body 120, when housing 400 is in the closed, upright position. Support shaft 430 comprises support pin 431, best seen in FIG. 12B, which is connected to first support arm 410 and releasably engageable with second support arm 420.

As best seen in FIG. 12A, first support arm comprises spike plate 411 comprising plant-engaging protrusions in the form of spikes 4110. First support arm further comprises first support arm channel 412 aligned with support connection channel 450 and passing through spike plate 411. Additionally, first support arm 410 is pivotally connected to support base 440 by support pivot 413.

Also with reference to FIG. 12A, second support arm 420 comprises a pin engaging portion (not shown); and second support arm channel 421, aligned with support connection channel 450 and first support arm channel 412.

In use, housing support 400 may be converted between a closed, upright position, as depicted in FIG. 8, and an open, inclined position, as depicted in FIG. 9. To convert housing support 400 from the closed position to the open position, support pin 431 is released from engagement with second support arm 420, and first support arm 410 is pivoted about support base 440 away from second support arm 420.

Upon release of support pin 431 from engagement with second support arm 420 and pivoting of first support arm 410 about support base 440, first support arm 410 and support shaft 430, move away from second support arm 420.

In use, when housing support 400 is in the open, inclined position, housing 100 can be removed from connection with housing support 400 and channel member 200, as depicted in FIG. 9. In use, when housing 100 is released from connection with housing support 400 and channel member 200, first housing case face 111 can be disconnected (not shown) from second housing case face 112 and housing case side 113, via clip-tab arrangement 1112.

In use, when first housing case face 111 is disconnected from second housing case face 112 and housing case side 113, housing body 120, best seen in FIG. 11, can be accessed and one or more capsules and/or closures can be readily loaded into capsule channels 126 of housing body 120.

In use, typically, one or more capsules for insertion into a plant are placed into one or more capsule channels 126 of housing body 120 as described above. Preferably, in use, one or more closures are further inserted into capsule channel 126 of housing body 120. In these preferred embodiments, suitably, the capsule is positioned towards housing body rim 121, and the closure is inserted towards housing body face 122, relative to the capsule. It will also be appreciated that in some alternative embodiments, in use, only a closure is inserted into capsule channel 126.

In use, when one or more capsules and/or closures are inserted into capsule channels 126, first housing case face 111 is connected with second housing case face 112 and housing case side 113. Housing 100 is then positioned within housing support 400, and housing support 400 is converted to the closed, upright position as depicted in FIG. 9. To convert housing support 400 from the open position to the closed position, first support arm 410 is pivoted about support base 440 towards second support arm 420, and support pin 431 is engaged with second support arm 420.

In use, when one or more capsules and/or closures are loaded into one or more capsule channels 126, housing body 120 is rotated about support shaft 430 of housing support 400 to position a capsule and/or closure loaded into a particular capsule channel 126 for insertion into a plant. More specifically, for insertion into a plant, said particular capsule channel 126 is positioned to be aligned with first support arm channel 412 of housing support 400; peripheral aperture 1111 of first housing case face 111; peripheral aperture 1121 of second housing case face 1121; and second support arm channel 421 of housing support 400.

Figure 13:
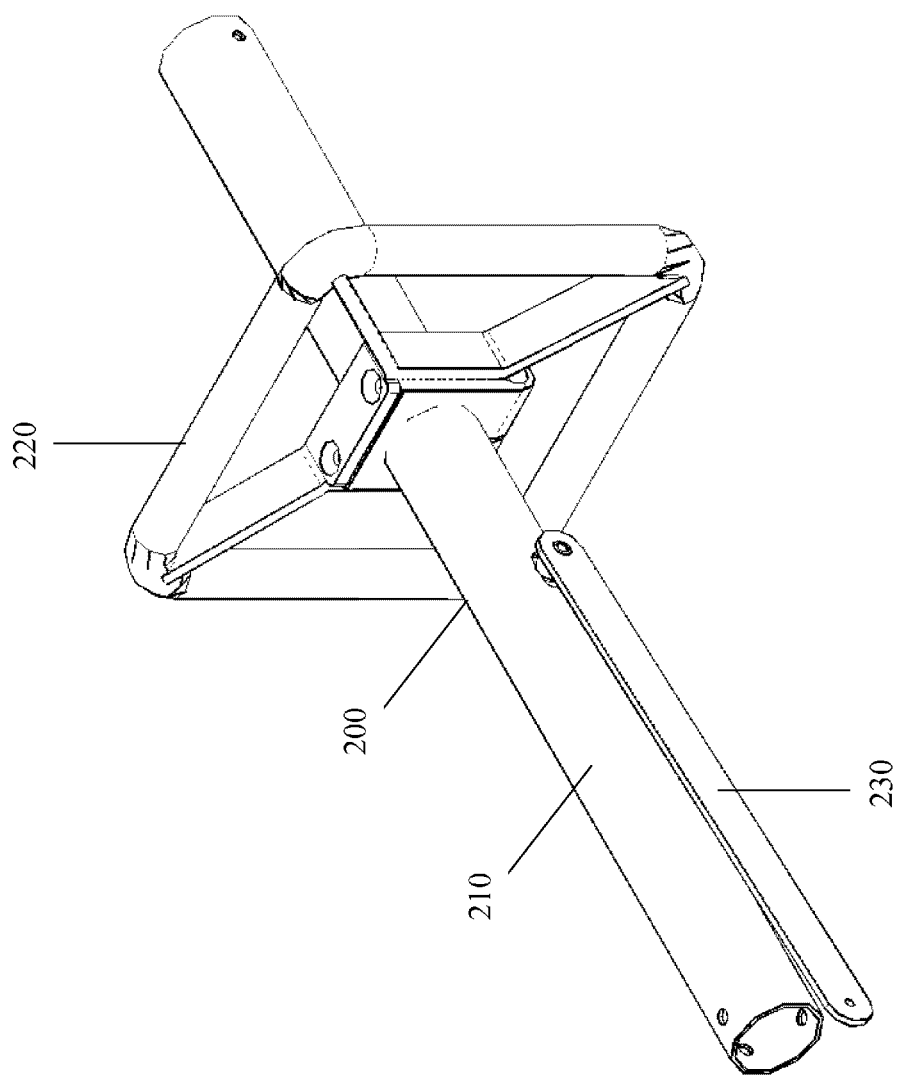
FIG. 13 sets forth a front perspective view of channel member 200 of the apparatus set forth in FIG. 1.
Figure 14:
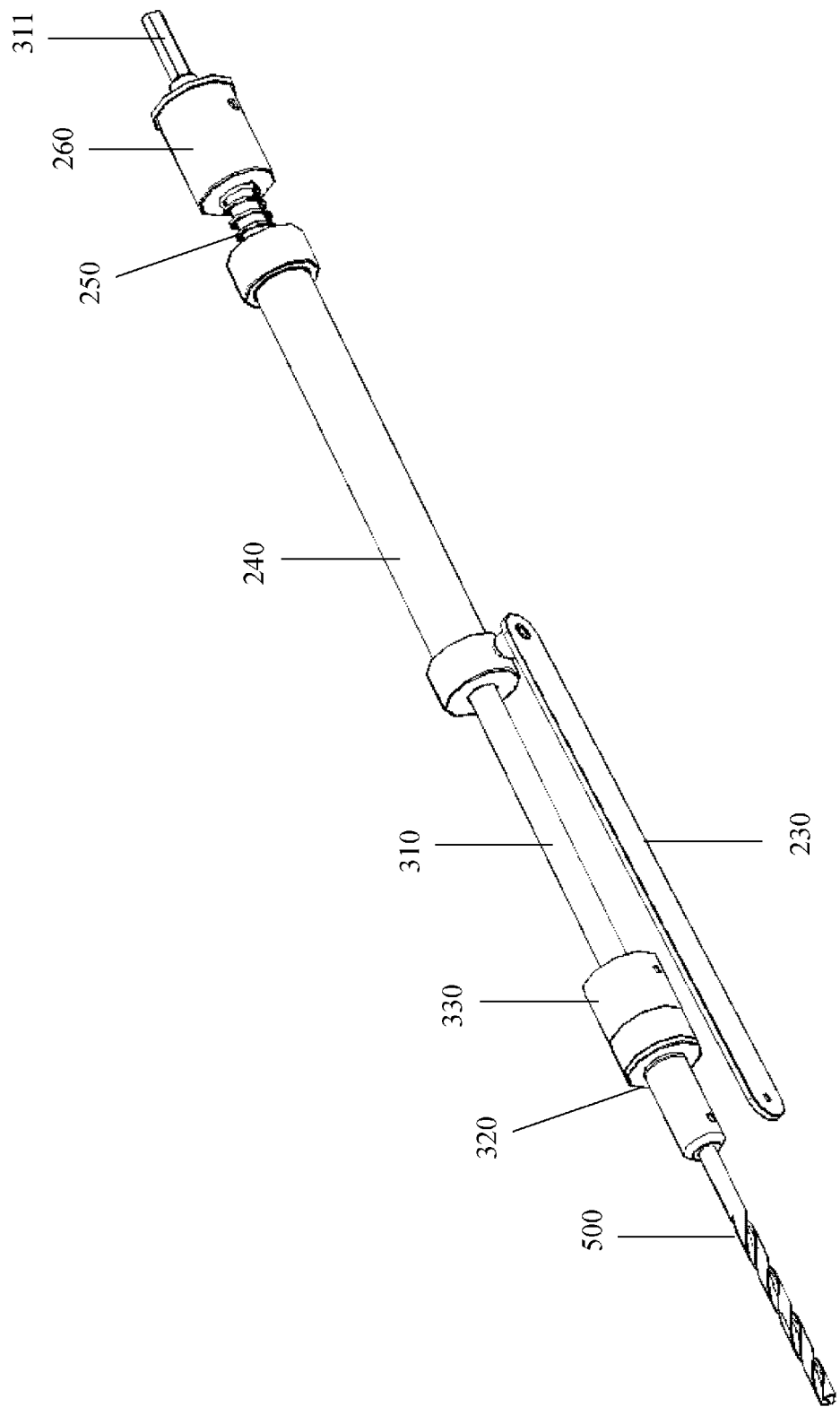
FIG. 14 sets forth a front perspective view of internal components of channel member 200, and adjustable member 300, of the apparatus set forth in FIG. 1.

Turning now to channel member 200 and adjustable member 300, as best seen in FIGS. 13 and 14, channel member 200 comprises a channel in the form of channel member body 210; handle 220; link 230; stopping tube 240; spring 250; and second bush 260. As best seen in FIG. 13, handle 220 is attached to channel member body 210. As best seen in FIG. 14, stopping tube 240; spring 250; and second bush 260 are located within channel member body 210. With reference to FIGS. 1-3, link 230 connects stopping tube 240 to housing support 400, and link 230 is in operative connection with housing 100 as hereinbelow described.

As best seen in FIG. 14, adjustable member 300 comprises adjustable member shaft 310; and mount 320; and first bush 330. Adjustable member shaft 310 passes through first bush 330; stopping tube 240; and second bush 260 within channel member body 210.

Adjustable member shaft 310; mount 320; and first bush 330 are slidable and rotatable relative to stopping tube 240; and second bush 260. Additionally, stopping tube 240 is slidable relative to second bush 260.

Also best seen in FIG. 14, a first end of adjustable member 300 is engaged with plant penetrating end 500, in the form of a drill bit, via mount 320. Drill bit 500 is capable of passing through support 400 and housing 100, by way of a capsule channel 126. At second end of adjustable member 300, shaft 310 of adjustable member 300 comprises connection bit 311.

Figure 15:
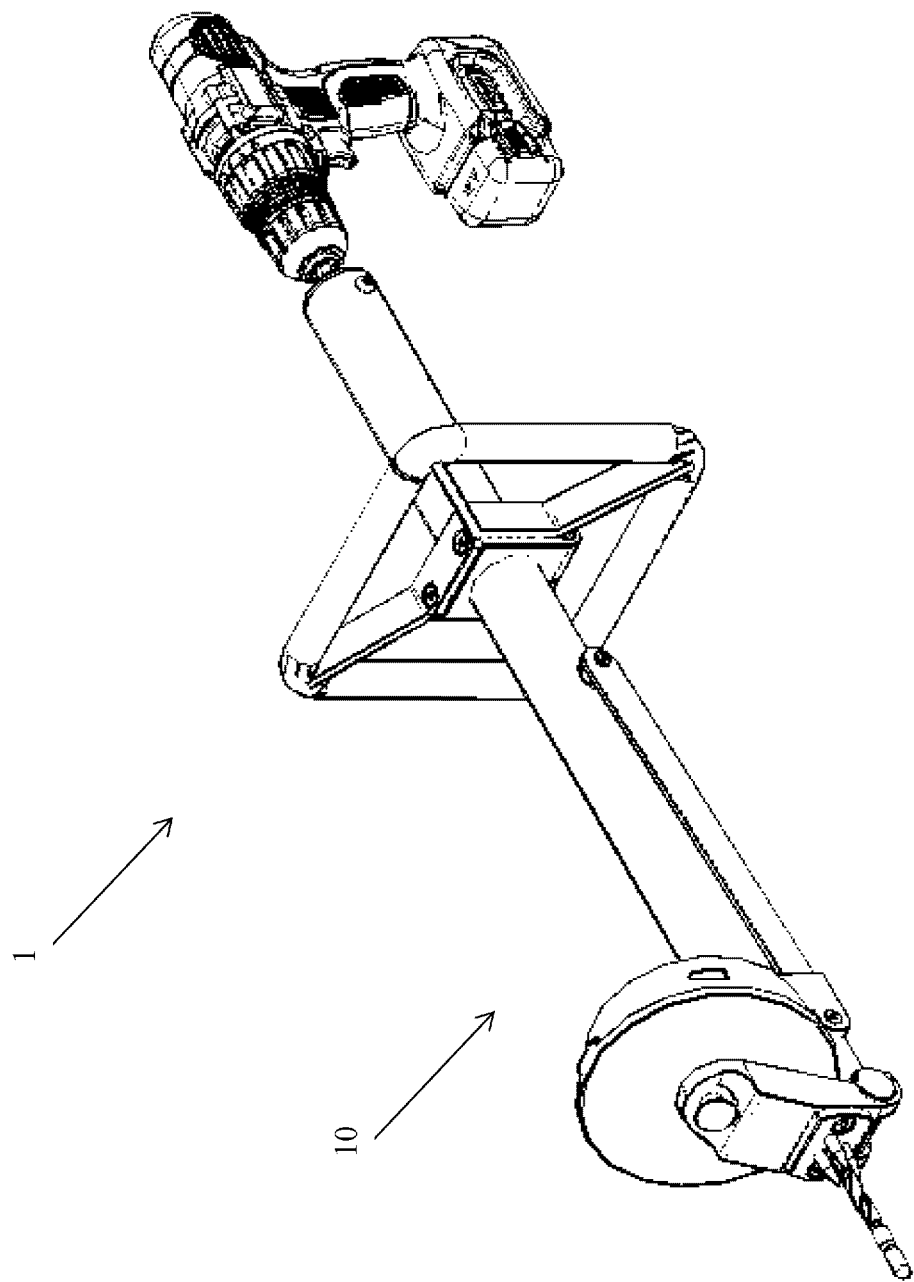
FIG. 15 sets forth a perspective view of a system of the invention comprising the apparatus set forth in FIG. 1 connected to a power drill.

In use, typically, connection bit 311 of adjustable member shaft 310 is connected with a power drill, such as depicted in FIG. 15. When connected with a power drill, activation of the power drill allows for a plant penetrating end, such as drill bit 500, engaged with adjustable member 300 via mount 320 to be driven via adjustment member shaft 310. In use, when driven by a power drill via adjustable member shaft 310, drill bit 500 can be used for forming an opening in a plant by drilling.

It will be appreciated that, in use, the particular plant penetrating end or drill bit that is mounted to adjustable member 300 via mount 320 can be varied, such as to suit plants, such as weeds, of different sizes or types.

In use, when forming an opening in a plant using apparatus 10 by drilling with drill bit 500, drill bit 500 is first positioned such that it does not substantially protrude from first support arm channel 412 of housing support 400. It will be understood that, in use, where drill bit 500 is protruding from support arm channel 412, such as depicted in FIG. 15, pulling of a power drill connected to connection end 311 of adjustable member 300 away from channel member 200, while holding handle 220, causes adjustment member shaft 310 to slide in the direction of the power drill, and drill bit 500 to retract within channel 412 of housing support 400.

In use, once drill bit 500 is retracted, spikes 4110 of first support arm 410 are forced into the plant to stabilise and support apparatus 10 against the plant. Drill bit 500 is then activated, and penetrated into the plant by pushing the power drill towards channel member 200 while holding handle 420.

In use, after forming an opening in a plant by drilling using drill bit 500, drill bit 500 can be removed from the plant by pulling of the power drill away from channel member 200, while holding handle 220, as described above. Typically, spikes 4110 of first support arm 410 are to remain within the plant while drill bit 500 is removed from the plant, to maintain the position of apparatus 10 relative to the plant.

Upon sufficient movement of the power drill away from channel member 200, drill bit 500 retracts through support arm channel 412 and capsule channel 126.

Retraction of drill bit 500 through capsule channel 126 allows for housing body 120 to be rotated to position a capsule and/or closure loaded into a particular capsule channel 126 for insertion into a plant, as hereinabove described.

In use, when drill bit 500 is sufficiently retracted through capsule channel 126 as described above, first bush 330 contacts stopping tube 240. In use, further retraction of the power drill urges first bush 330 and stopping tube 240 against the bias of spring 250, towards second bush 260. In use, when stopping tube 240 is moved towards second bush 250, link 230 actuates housing body 120, rotating housing body 120 relative to support 400, to thereby position a capsule channel 126 in alignment with channel member body 210.

In use, when drill bit 500 is retracted and a capsule channel 126 loaded with a capsule and/or closure is positioned for insertion into a plant, drill bit 500 can be used to insert the capsule and/or closure within an opening formed in a plant. More specifically, suitable pushing of a power drill connected to connecting end 311 of adjustable member 300 causes retracted drill bit 500 to pass into the capsule channel 126 loaded with a capsule and/or closure and emerge from channel 412 of housing support 400, forcing the capsule and/or closure into an opening formed in the plant.

Figure 16:
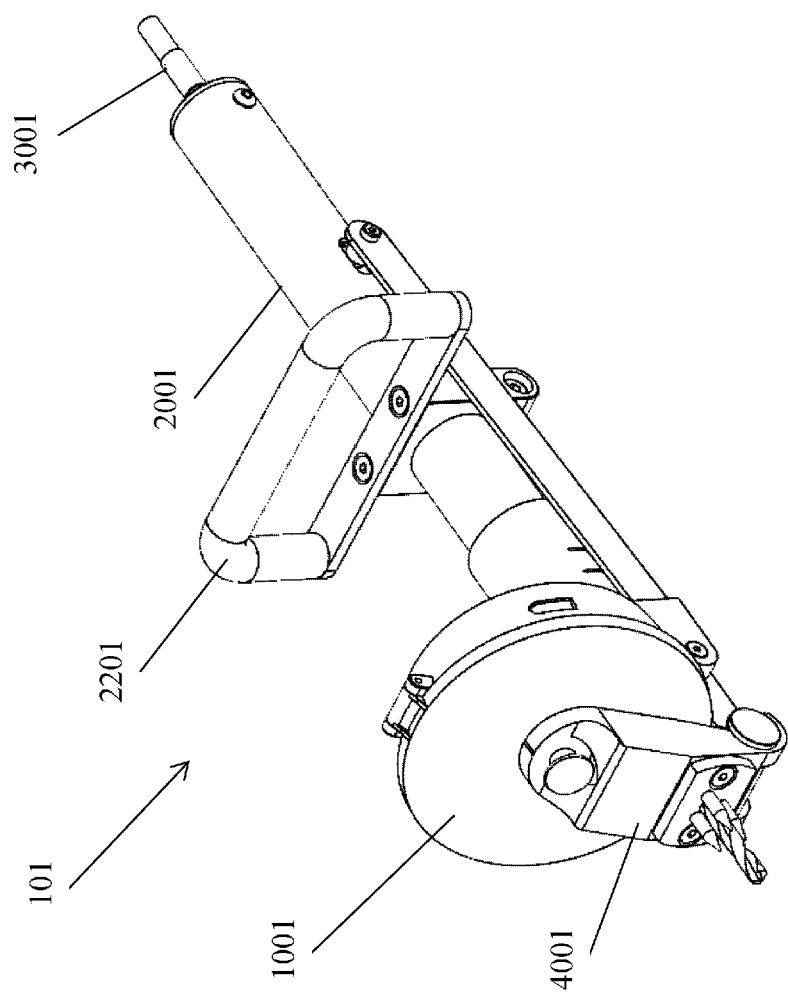
FIG. 16 sets forth a front perspective view of an embodiment 101 of an apparatus for insertion of a capsule into a plant according to the invention.

Looking now at FIG. 16, another preferred embodiment 101 of an apparatus of this aspect is shown. Apparatus 101 comprises components corresponding to those of apparatus 10, set out above, including housing 1001; channel member 2001; adjustable member 3001; and housing support 4001, corresponding respectively to housing 100; channel member 200; adjustable member 300; and housing support 400 of apparatus 10.

The structure and use of apparatus 101 is substantially as described above for apparatus 10. However, as compared to channel member 200 of apparatus 10, channel member 2001 of apparatus 101 is substantially shorter. A longer or shorter channel member may be preferable for the apparatus of this aspect based on user preference and/or size, shape, or planting arrangement of a plant into which a capsule is to be inserted using the apparatus.

Furthermore, while handle 220 of apparatus 110 comprises a 'full' grip portion surrounding channel member body 210, handle 2201 comprises a 'half' grip portion extending in a similar direction as housing body 1001 (when in the closed position). It will be appreciated that apparatus 10 can be readily modified to comprise handle 2201, or apparatus 101 can be readily modified to comprise handle 220, if desired.

The invention disclosed herein therefore provides a capsule capable of delivering agents to plants, such as weeds, and an apparatus that is suitable for inserting the capsule that provides a relatively safe and easy to use system for regulating the growth of plants, such as weeds.

Throughout this specification, the aim has been to describe the preferred embodiments of the invention without limiting the invention to any one embodiment or specific collection of features. Various changes and modifications may be made to the embodiments described and illustrated herein without departing from the broad spirit and scope of the invention.

All computer programs, algorithms, patent and scientific literature referred to herein is incorporated herein by reference in their entirety.

EXAMPLES

Example 1: Weed Control Trials Using Glyphosate Capsules

Trials were conducted to assess the effectiveness of methods, capsules, and apparatus as described herein for the inhibition of weeds, and in particular woody weeds.
Materials and Methods
General Glyphosate (~330 mg 700 gms/kg ai, Glymac Dri 700, Macspred Pty Ltd) was prepared in pharmaceutical grade capsules. The capsules used were HPMC Size 0 Natural TR.V700 colour cap and body Vcaps (Suzhou Capsugel® Ltd, China). Capsules were hand packed using a Capsugel Profiller apparatus (https://www.capsugel.com/biopharmaceutical-products/profiller).

To apply capsules to woody weeds, an embodiment of apparatus 10 was used to drill a hole into the stem, insert the capsule, and seal with a polypropylene plug. Notably, this embodiment of apparatus 10 included a serrated tube in place of spikes 4110. Generally, one capsule was inserted per 10 cm stem circumference.

Tree health was assessed on a 0-4 scale, 0 being dead and 4 being healthy. Observations were made for evidence of 'flashback' in nearby untreated trees. At later assessment times a small sample of trees were cut down and cross sections of stems containing the sites of insertion were removed. These stem pieces were returned to the laboratory and split open longitudinally through the insertion point.

Case 1: Control of Prickly *Acacia* (*Vachellia nilotica* (L.) P. J. H. Hurter & Maub) with Capsules of Dry Glyphosate ('Di-Bak G')

A trial was established at Bilaban Station, St Lawrence, Queensland (GPS S22° 20.913' E149° 30.203') on 5 Dec. 2016. At application (TO) trees were assessed as being healthy with no dead branches and substantial foliage. The trees were mature and flowered regularly. Stem diameters at 30 cm above ground level varied from 4-20 cm and trees were up to 4 m tall.

Application treatments consisted of applying 1, 2, 3 or 4 glyphosate capsules equidistant around the tree trunks at ~30 cm above ground level of around 10 trees each. The first thorough assessment was done 9MAT (months after treatment) on 15 Sep. 2017. Stem circumferences at 30 cm above ground level, number of applications per tree, and foliage cover and percentage branch death were recorded.

Assessment of foliage cover was complicated by an earlier natural infestation of the leaf-feeding geometrid looper caterpillar, *Chiasmia assimilis*, that led to significant defoliation from which the trees were recovering. Weather data was collected at the nearby (<5 km) St Lawrence Post Office.

Case 2: Use of Di-Bak G in the Thinning of Plantation Grown *Eucalyptus saligna* Sm. (Sydney Blue Gum)

A trial was established on Brooklyn Station, Upper Tooloom, near Urbenville on 25 May 2017. GPS co-ordinates of the first treated plot were S28° 32.486' E152° 24.782'. The trees were about 15 years old and are planted in rows 4 m apart at 1.5 m spacing. Trees were 6-10 m tall. Desirable trees were marked and the other trees were treated.

The trial consisted of four replicates with 15 trees per replicate. The number of capsules applied to each tree was dependent on tree circumference which was measured at chest height. The tree circumferences range was from 18 to 57 cm. Tree health was assessed at 4 months (25 Aug. 2017) and 7 months (20 Dec. 2017). Samples were collected for observation of dissolution of capsule and herbicide. Rainfall data for the closest recording station (Urbenville) was taken from the Bureau of Meteorology (BOM) internet site. No recent temperature data records were available for this site.

Case 3: Dose Rate Effect of Di-Bak G on *Eucalyptus dunnii* (Dunn's White Gum

In this trial, one, two or three capsules of glyphosate were inserted into *Eucalyptus dunnii* trees irrespective of their circumference. The trial was established on Brooklyn station, Upper Tooloom, near Urbenville on 26 May 2017. GPS co-ordinates were S28° 32.488' E152° 24.778'. The trees were arranged in a similar manner, and similar in age and size, to the *E. saligna* trees described in Case 2. Desirable trees were marked and the other trees were treated.

This trial consisted of one replicate of 15 trees for each treatment. The number of capsules applied using the apparatus as described above to each tree was independent of tree circumference which was measured at chest height. Tree health was assessed at 4 months (25 Aug. 2017) and 7 months (20 Dec. 2017). Untreated trees were observed for signs of flashback. At the 4 month assessment, samples were collected for observation of dissolution of capsule and herbicide. Rainfall data for the closest recording station (Urbenville) was taken from the Bureau of Meteorology (BOM) internet site. No recent temperature data records were available for this site.

Results

Case 1

Data is presented in Table 2. The plant health rating scale was formulated as a linear model based on foliage cover and percentage of living branches. Given that the defoliation caused by *C. assimilis* confounded the analysis it was decided to compare all treated trees to the mean health rating of the control untreated trees giving a proportional result between 0 (dead) to 1 (as healthy as control trees).

Case 2

The stem circumferences of treated trees ranged from a minimum of 12 cm to a maximum of 70 cm. On average, a capsule was inserted every 13-14 cm of stem circumference. Stem pieces that were cut and split 4 months after treatment revealed that the capsules had dissolved in all treatments and no traces of glyphosate were observed. At four months there were indications of deterioration in tree health as expressed by leaf drop and bark splitting. There was over 90% mortality. By the 7 month assessment there had been good rainfall but no indication of reshooting or flashback was observed.

The failure of full strength glyphosate to kill all treated trees observed in this case may have been due to loss of the sealing plugs. If the plug, for whatever reason, is displaced soon after application it is likely that moisture loss will prevent solubilisation of the capsule and herbicide. The use of spikes 4110 in place of a serrated tube (as described above) in apparatus 10 has been found to reduce the probability of sealing plugs being lost, as the spike arrangement improves accuracy of guiding the capsule and plug into the opening.

Case 3

Data is presented in Table 3. Applying 3 capsules of glyphosate had killed all treated trees by 4 months. At 4 months ~90% of trees treated with 2 capsules were dead and by 7 months all had been killed. However, on average, the trees treated with 2 capsules had the largest girth of the treatments. This might explain the delayed response. Use of a single capsule resulted in ~70% mortality at 4 months which increased to ~80% by 7 months.

The observation that a better kill was achieved with *E. dunnii* compared to *E. saligna* might be explained by the former having a thicker bark and softer wood which allowed more complete insertion of the plug. There was no sign of flashback even with the highest dose rate.

Discussion

This example demonstrates that insertion of encapsulated dry glyphosate ('Di-Bak G') can be a potent control method for unwanted trees. The methodology used delivers chemical directly in the trees vascular system thereby efficiently harnessing the agent's weed-killing activity. Advantageously, in comparison to other commonly used manual methods such as cut stump and basal bark spraying, only 20-30% of the chemical quantity is required with the methodology described herein to achieve the same result.

Application of minimal dosages such as used here will reduce occurrence of 'flashback'. As well, no axes, hatchets, backpacks and tank mixes of liquid herbicide, chainsaws or diesel distillates were required. No waste, no need to dispose of unused chemicals and easy storage of capsules were additional benefits of this method. Application of a single capsule could kill prickly *acacia* trees with stem circumference of up to 30 cm. On larger stems insertion of a capsule every 10 to 15 cm was effective. Care was taken to ensure that insertion was done below major branches. The method used was observed to be highly effective against the *Eucalypt* species tested.

Example 2: Weed Control Trials Using Glyphosate and Hexazinone Capsules

This example sets out the evaluation of the efficacy of encapsulated herbicide (glyphosate or hexazinone) delivery for the elimination of undesirable trees (thinning) in plantations of western white gum (*Eucalyptus argophloia*).

Materials and Methods

The trial for this example was established at the HQP plantation near Jandowae on 6 Feb. 2018. The trees were planted in rows 4 m apart at 1.5 m spacing. Trees were 6-10 m tall. Trees to be maintained were marked and the other trees were treated.

Four treatments were used, with capsules as follows:

1. Glyphosate 1 capsule per tree (~330 mg 700 gms/kg ai, Glymac Dri 700, Macspred Pty Ltd) (GPS: S260 41.585' E1510 08.567' to S260 41.585' E1510 08.561').

2. Glyphosate 2 capsules per tree (~330 mg 700 gms/kg ai, Glymac Dri 700, Macspred Pty Ltd) (GPS: S260 41.581' E1510 08.559' to S260 41.578' E1510 08.547').

3. Hexazinone 1 capsule (~250 mgs 750 gms/kg ai, Hexmac 750SG, Macspred Pty Ltd) (GPS: S260 41.579' E1510 08.574' to S260 41.575' E1510 08.565').

4. Hexazinone 2 capsules (~250 mgs 750 gms/kg ai, Hexmac 750SG, Macspred Pty Ltd) (GPS: S260 41.573' E1510 08.563' to S260 41.576' E1510 08.551').

Figure 17:
FIG. 17 sets forth the operation of a system of the invention comprising apparatus 10 connected to a power drill, to insert a capsule into the stem of a *Eucalyptus argophloia* plant.

The capsules used were HPMC Size 0 Natural TR.V700 colour cap and body Vcaps (Suzhou Capsugel® Ltd, China). Capsules were hand packed using a Capsugel Profiller apparatus (https://www.capsugel.com/biopharmaceutical-products/profiller). An embodiment of apparatus 10 adapted to include handle 2201 (FIG. 17) was used to drill a hole into the stem, insert the herbicide capsule and seal with a wooden plug.

Herbicide capsules were applied to approximately 10 trees for each of the treatments. The number of capsules applied to each tree was independent of tree circumference which was measured at chest height. The tree circumferences range was from 20 to 34 centimetres. At 4 weeks, a small sample of trees were cut down with a chainsaw and cross-sections of stems containing the sites of insertion of the herbicide capsules removed. These stem pieces were returned to the laboratory and split open longitudinally through the insertion point. Tree health was assessed at 11 weeks (24 Apr. 2018) on a 0-4 scale with 0 being dead and 4 being healthy. Observations were made for evidence of flashback in untreated trees.

Results and Discussion

The range of stem circumferences of treated trees ranged from a minimum of 20 cm to a maximum of 34 cm. The trial was established in late February 2018 after good rainfall. The trees could therefore be expected to be well hydrated. More rain followed treatment. Stem pieces that were cut and split 4 weeks after treatment revealed that the capsules had dissolved for both herbicides and no traces of glyphosate or hexazinone were observed.

Figure 18:
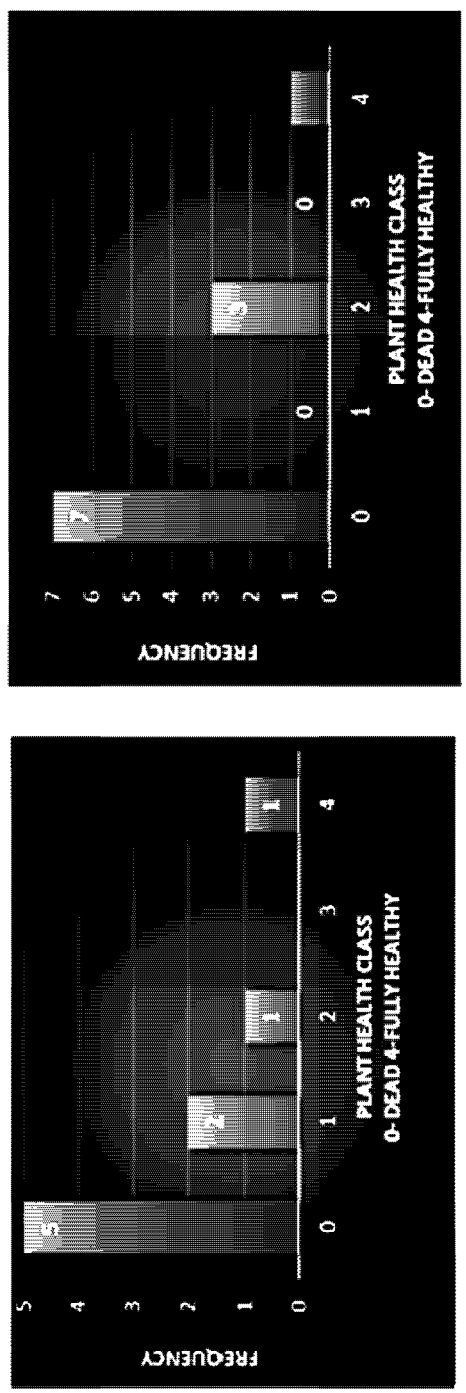
FIG. 18 sets forth the frequency of each tree health class for *Eucalyptus argophloia* trees treated with either one capsule (A) or two capsules (B) of glyphosate, as described in Example 2.

Health ratings at 11 weeks post treatment showed that the majority of trees treated with glyphosate at either 1 or 2 capsules per tree had died (FIG. 18). There were some trees however that looked totally healthy and some that showed evidence of herbicide treatment. In some cases it was obvious that there was a branch effect where capsule placement had not aligned with major branches which seemed to escape effect of the herbicide. The presence of totally healthy trees was attributed to an operator effect where inexperienced operator(s) failed to properly insert the herbicide capsule.

Figure 19:
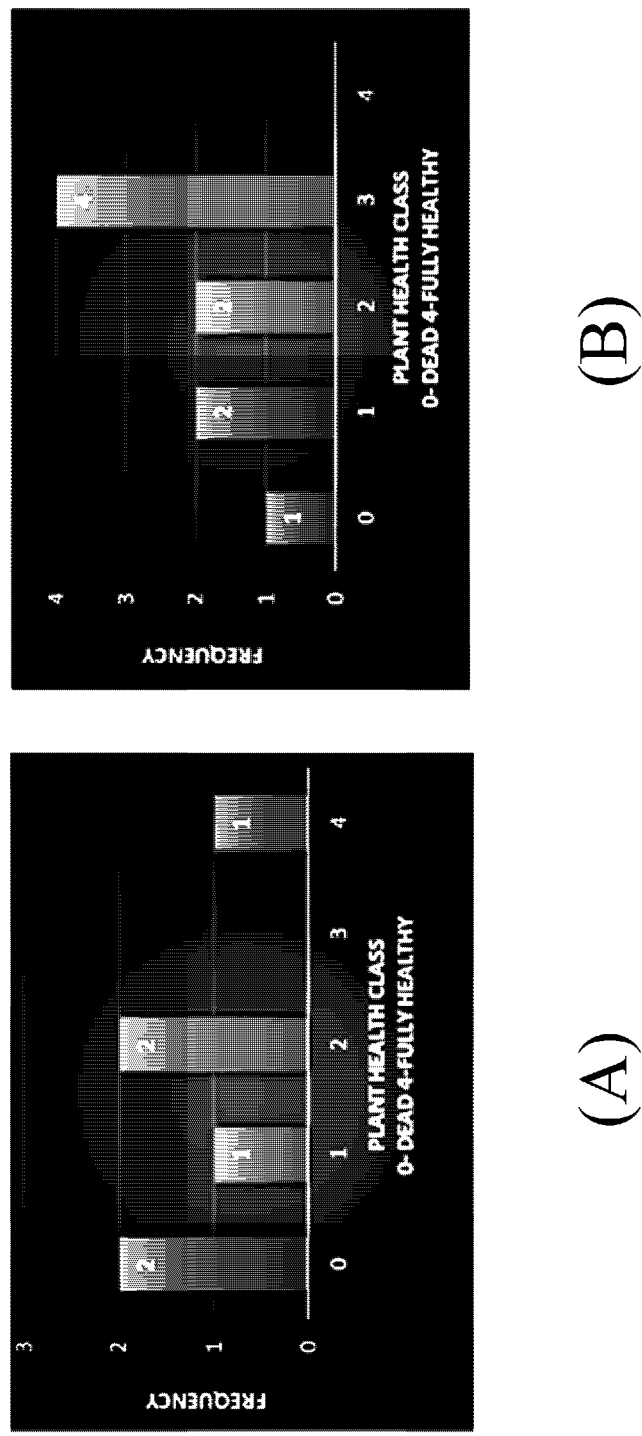
FIG. 19 sets forth the frequency of each tree health class for *Eucalyptus argophloia* trees treated with either one capsule (A) or two capsules (B) of hexazinone, as described in Example 2.

Trees treated with hexazinone were less effected with only a small percentage of trees killed at 11 weeks. There was obvious deterioration in plant health (FIG. 19) as seen by yellowing of the foliage. At the 11 week assessment date no flashback was observed in the trees marked for retention.

Example 3: Weed Control Trials Using Glyphosate and Glyphosate+Imazapyr Capsules This example sets out the evaluation of the efficacy of encapsulated herbicide (glyphosate or glyphosate+imazapyr) delivery for the elimination of undesirable trees (thinning) in plantations of western white gum (*Eucalyptus argophloia*).

Materials and Methods

The trial was established at the HQP plantation near Jandowae on 6 Feb. 2018. The trees were planted in rows 4 m apart at 1.5 m spacing. Trees were 6-10 m tall. Trees to be maintained were marked and the other trees were treated.

Four treatments were used, with capsules as follows:

1. Glyphosate 1 capsule per tree (~330 mg 700 gms/kg ai, Glymac Dri 700, Macspred Pty Ltd) (GPS: S260 38.669' E1510 15.972' to S260 38.668' E1510 15.980').

2. Glyphosate 2 capsules per tree (~330 mg 700 gms/kg ai, Glymac Dri 700, Macspred Pty Ltd) (GPS: S260 38.668' E1510 15.983' to S260 38.670' E1510 15.995').

3. Glyphosate/imazapyr (1:1 v/v) 1 capsule (~160 mg 700 gms/kg ai, Glymac Dri 700, Macspred Pty Ltd, ~180 mg 750 gms/kg Poacher 750 Apparent Pty Ltd) (GPS: S260 38.680' E1510 15.968' to S260 38.679' E1510 15.984').

4. Glyphosate/imazapyr (1:1 v/v) 2 capsules (~160 mg 700 gms/kg ai, Glymac Dri 700, Macspred Pty Ltd, ~180 mg 750 gms/kg Poacher 750 Apparent Pty Ltd) (GPS: S260 38.683' E1510 15.986' to S260 38.682' E1510 15.996').

Capsules and applicator used were as described in Example 2.

Herbicide capsules were applied to approx. 10 trees for each of the treatments. The number of capsules applied to each tree was independent of tree circumference which was measured at chest height. The tree circumferences range was from 12 to 25 centimetres. At 4 weeks, a small sample of trees were cut down with a chainsaw and cross-sections of stems containing the sites of insertion of the herbicide capsules removed. These stem pieces were returned to the laboratory and split open longitudinally through the insertion point. Tree health was assessed at 11 weeks (24 Apr. 2018) on a 0-4 scale with 0 being dead and 4 being healthy. Observations were made for evidence of flashback in untreated trees.

Results and Discussion

Figure 20:
FIG. 20 sets forth an insertion site in a *Eucalyptus argophloia* stem within which a capsule containing glyphosate+imazapyr was placed, showing remnant imazapyr, as described in Example 3.

The range of stem circumferences of treated trees ranged from a minimum of 12 cm to a maximum of 25 cm. The trial was established in late February 2018 after good rainfall. The trees could therefore be expected to be well hydrated. More rain followed treatment. Stem pieces that were cut and split 4 weeks after treatment revealed that the capsules had dissolved for both herbicides with no traces of glyphosate observed but traces of imazapyr remained (FIG. 20).

Figure 21:
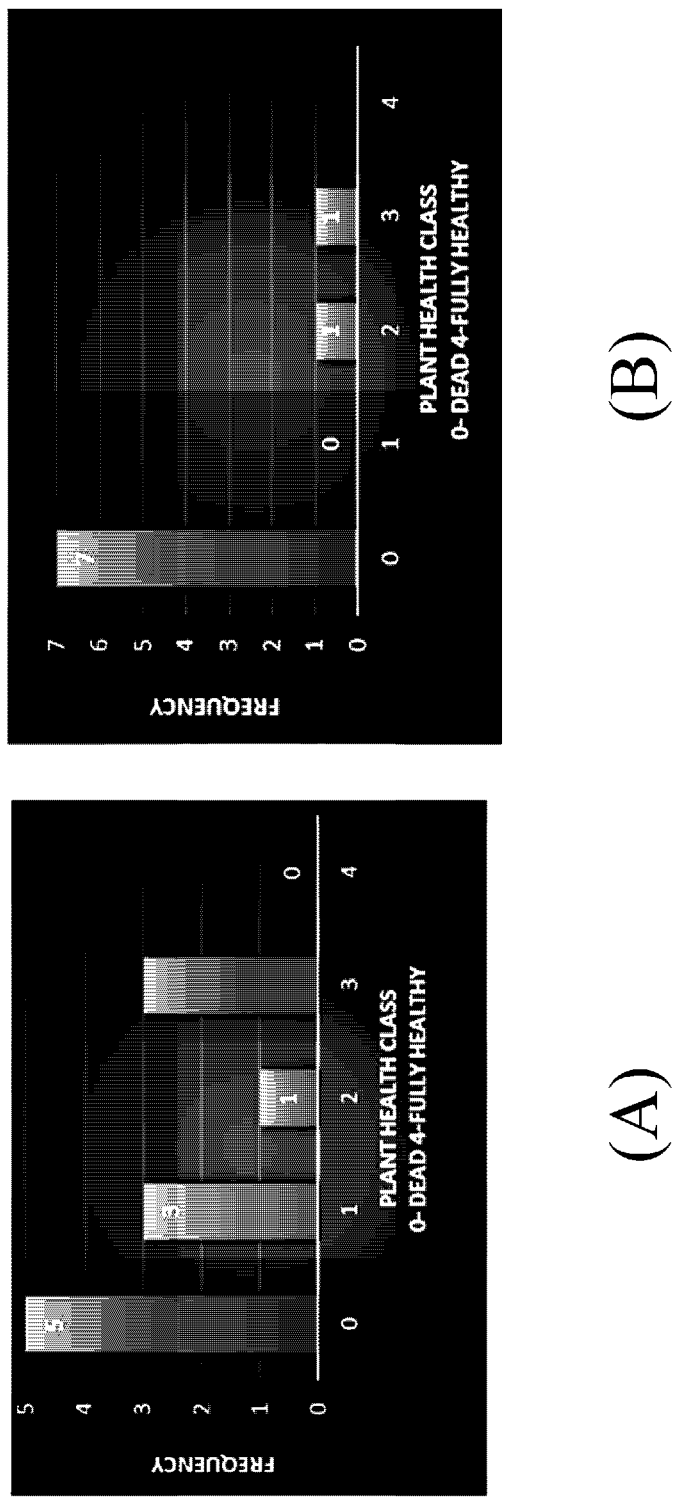
FIG. 21 sets forth the frequency of each tree health class for *Eucalyptus argophloia* trees treated with either one capsule (A) or two capsules (B) of glyphosate, as described in Example 3.

Health ratings at 11 weeks post treatment showed that the majority of trees treated with glyphosate at either 1 or 2 capsules per tree had died (FIG. 21). There were a few trees that showed some deterioration in health. In some cases it was obvious that there was a branch effect where capsule placement had not aligned with major branches which seemed to escape effect of the herbicide. Branches below the insertion point on some trees were still healthy while the upper part of the tree had been killed. This demonstrates a translocation effect of the herbicide. These plants are to be further examined over time.

Figure 22:
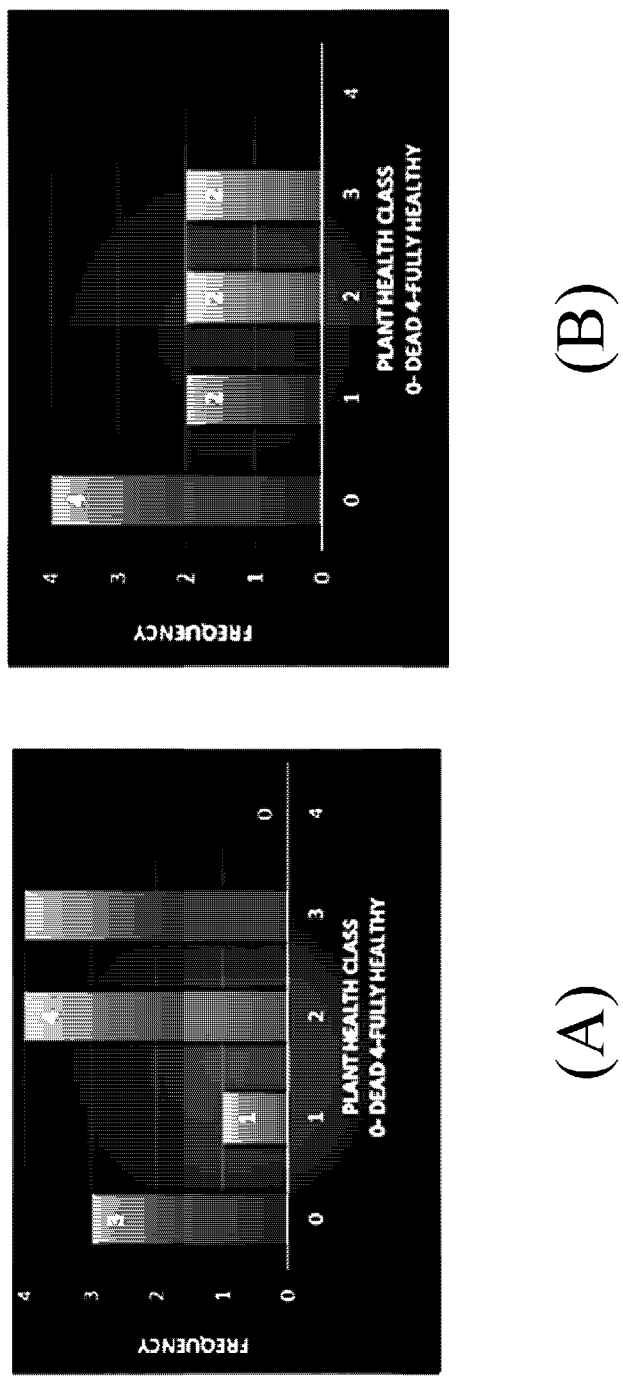
FIG. 22 sets forth the frequency of each tree health class or trees treated with either one capsule (A) or two capsules (B) of glyphosate/imazapyr, as described in Example 3.

The combination of glyphosate and imazapyr was less potent than pure glyphosate with only 25% of trees killed by 11 weeks. Many trees showed only minor deterioration (FIG. 22).

At the 11 week assessment date no flashback was observed in the trees marked for retention.

Tables

TABLE 1

Woody weeds and suitability of herbicides for control of same.

| Botanical Name | Common Name | Di[1] | Du | G | H | I | M | P | Te | Tr | G + M | G + Tr | P + Tr |
|---|---|---|---|---|---|---|---|---|---|---|---|---|---|
| *Acacia* spp | Wattles |  | X | X |  | X | X | X | X |  |  |  | X |
| *Acer negudo* | Box elder |  | X |  |  |  |  |  |  | X |  |  |  |
| *Ailanthus altissima* | Tree-of-heaven |  |  | X | X | X |  |  | X | X |  |  | X |

TABLE 1-continued

Woody weeds and suitability of herbicides for control of same.

| Botanical Name | Common Name | Di[1] | Du | G | H | I | M | P | Te | Tr | G + M | G + Tr | P + Tr |
|---|---|---|---|---|---|---|---|---|---|---|---|---|---|
| *Angophora* spp | Apple | | | | | | X | | | X | | | X |
| *Atalaya hemiglauca* | Whitewood | | | | | | | | X | | | | |
| *Azadirachta indica* | Neem | | | | | | | X | | X | | | X |
| *Banksia* spp | Bottlebrush | | | | | | | | | X | | | X |
| *Bursaria spinosa* | Australian blackthorn | | | | | | X | | | X | | | X |
| *Caesalpinia decapetala* | Thorny poinciana | | | | | | X | | | | | | |
| *Calotropis procera* | Rubber bush | | | | | | | | X | | | | X |
| *Cascabela thevetia* | Yellow oleander | | | X | | X | | | | | | | X |
| *Casuarina* spp | She-oaks | | | | | | | | | | | | X |
| *Celtis sinensis* | Chinese *celtis* | | | X | | | | | | | | | |
| *Cestrum elegans* | Purple *cestrum* | | | | | | | | | | | | |
| *Cestrum fasciculatum* | Red *cestrum* | | | | | | | | | | | | |
| *Cestrum nocturnum* | Night jasmine | | | | | | | | | | | | |
| *Cestrum parqui* | Green *cestrum* | | | X | | | | | | X | | | X |
| *Chamaecytisus palmensis* | Tree lucerne | | | | | | X | X | | | | | X |
| *Cinnamonum camphora* | Camphor laurel | | | X | | | | | | X | | | X |
| *Crataegus sinaica* | Azarola | | | X | | | | | | X | X | X | X |
| *Coffea arabica* | Coffee | | | | | | | | | | | | |
| *Cryptostegia grandiflora* | Rubber vine | X | | | X | X | X | | X | X | | | X |
| *Eremophila mitchellii* | False sandalwood | | | | | | | | X | | | | |
| *Eriobotrya japonica* | Loquat | | | | | | | | | | | | |
| *Erythrina crista-galli* | Cockspur coral tree | | | X | | | | | | | | | X |
| *Erythrina sykesii* | Coral tree | | | X | | | | | | | | | |
| *Eucalyptus* spp | Box, Eucalypt | | | | X | | X | | | X | | | X |
| *Eugenia uniflora* | Brazilian cherry | | | | | | | | | | | | |
| *Fraxinus angustifolia* | Desert ash | | | | | | | | | | | | |
| *Gleditsia triacanthos* | Honey locust | | | X | | | | | | | | | |
| *Gmelina elliptica* | Badhara bush | | | | | | | | | | | | |
| *Harungana madagarcariensis* | Harungana | | | X | | X | X | | | | | | X |
| *Ilex aquifolium* | Holly | | | | | | | | | | | | |
| *Inga edulis* | Icecream tree | | | X | | | | | | | | | |
| *Jatropha gossypiifolia* | Bellyache bush | | | | | | X | | | | | | |
| *Koelreuteria elegans* | Golden rain tree | | | X | | | | | | | | | |
| *Lantana camara* | Lantana | | | X | | | X | X | X | X | X | | X |
| *Leucaena leucocephala* | *Leucaena* | | | | | | | X | | | | | X |
| *Lagunaria patersonia* | Norfolk Island hibiscus | | | | | | | | | | | | |
| *Leptospermum* spp. | Tea trees | | | X | | | | X | | | | | |
| *Ligustrum lucidum* | Broad leaf privet | | | X | | | X | X | | X | | | |
| *Ligustrum sinense* | Chinese privet | | | X | | | X | | | X | | | X |
| *Lycium ferocissium* | African boxthom | | | X | X | | | X | X | X | | | X |
| *Melalauca* spp | | | | | | | | | X | | | | |
| *Miconia calvescens* | Velvet tree | | | X | | | | | | | | | |
| *Mimosa pigra* | Mimosa | X | | X | | | X | | X | | | | |
| *Olea europea* sbsp *africana* | African olive | | | X | | | | | | X | | | |
| *Olea europea* sbsp *europa* | European olive | | | | | | | | | X | | | |
| *Oleander nerium* | Oleander | | | | | | | | | | | | X |
| *Parkinsonia aculeata* | Parkinsonia | | | | X | | | | X | | | | X |
| *Paulownia fortunei* | Paulownia | | | | | | | | | | | | |
| *Phoenix* spp | Palms | | | X | X | | | | | X | | | |
| *Pittosporum undulatum* | Sweet *pittosporum* | | | X | | | | | | | | | |

TABLE 1-continued

Woody weeds and suitability of herbicides for control of same.

| Botanical Name | Common Name | Di[1] | Du | G | H | I | M | P | Te | Tr | G + M | G + Tr | P + Tr |
|---|---|---|---|---|---|---|---|---|---|---|---|---|---|
| *Planchonia careya* | Cocky apple | | | | | | | | X | | | | |
| *Populus* spp | Poplars | | X | | | | | | | | | | |
| *Prosopis* spp | Mesquite | | | | | | | | | X | | | X |
| *Psidium cattleianum* | Cherry guava | | | X | | | | | | | | | |
| *Ricinus communis* | Castor oil plant | | | X | | | | | | X | | | |
| *Robinia pseudoacacia* | Black locust | | | | | | | | | | | | |
| *Rubus anglocandicans* | Blackberry | | | X | | | X | X | | X | X | | X |
| *Salix* species | Willows | | | X | | | X | | | | | | X |
| *Schefflera actinophyla* | Umbrella tree | | | X | | | | | | | | | |
| *Schinus molle* | Peppercorn tree | | | | | | | | | | | | |
| *Schinus terebinthifolius* | Broad-leafed pepper tree | | | X | | X | | X | | X | | | X |
| *Senegalia catechu* | Cutch tree | | | X | | | X | X | | | | | |
| *Senna occidentalis* | Coffee *senna* | | | | | | | | | | | | X |
| *Senna pendula* | Winter *senna* | | | X | | X | | | | | | | |
| *Senna septemtrionis* | Smooth *senna* | | | | | | | | | | | | |
| *Solanum mauritianum* | Wild tobacco tree | | | X | | | X | | | | | | X |
| *Spathodea campanulata* | African tulip tree | | | | | | | | | | | | |
| *Syagrus* spp | Palms | | | | | | | | | | | | |
| *Tabebuia aurea* | Tabebuia | | | X | | | | | | | | | |
| *Tamarix aphylla* | Athel pine | | | | X | | | | | X | | | |
| *Tipuana tipu* | Tipuana | | | X | | | | | | | | | X |
| *Toxicodendron succedaneum* | Rhus | | | X | | | | | | | | | |
| *Triadica sebifera* | Chinese tallow tree | | | X | | | | | | | | | |
| *Vachellia famesiana* | Mimosa bush | X | | | | | X | | | | | | X |
| *Vachellia karroo* | Karoo thorn | | | | | | | | | | | | X |
| *Vachellia nilotica* | Prickly *acacia* | X | | X | | | | X | X | | | | X |
| *Ziziphus mauritania* | Chinee apple | | | | | | X | X | | | | | X |

Di = Dicamba; Du = Diuron; G = Glyphosate; H = Hexazinone; I = Imazapyr; M = Metsulfuron-methyl; P = Picloram; Te = Tebuthiuron; Tr = Triclopyr. X indicates that the given herbicide is suitable for controlling the given weed.

TABLE 2

Relationship of capsule number applied and tree circumference on prickly *acacia* tree health at 9 months after treatment (MAT).

| Stem Circumference (cm) | # of capsules applied | | | | | |
|---|---|---|---|---|---|---|
| | 1 | 2 | 3 | 4 | 5 | 6 |
| 0-20 | | | 0.0[A] (n = 2)[B] | | | |
| 21-30 | 0.0 (n = 3) | 0.0 (n = 3) | | | | |
| 31-40 | 0.1 (n = 2) | 0.17 (n = 2) | 0.0 (n = 2) | | | |
| 41-50 | 0.35 (n = 6) | 0.21 (n = 3) | 0.01 (n = 2) | 0.016 (n = 5) | 0.0 (n = 2) | |
| 51-60 | 0.58 (n = 4) | 0.18 (n = 3) | 0.01 (n = 1) | 0.0 (n = 2) | — | 0.01 (n = 3) |
| >61 | | 0.42 (n = 1) | | 0.06 (n = 2) | 0.18 (n = 1) | |

[A] Mean plant health of treated trees as a proportion of healthy untreated trees. 0.0 - plants dead to 1.0 - plants as healthy as untreated trees.
[B] Number of plants assessed in each cohort.

TABLE 3

"Chest Height" measurements of tree circumferences and mean distance between capsules.

| Treatment Di-Bak G | Stem Circumference (cm) Min - (Average) - Max | Distance between Capsules (cm) |
|---|---|---|
| 1 Capsule | 20 - (38.67) - 58 | 38.7 |
| 2 Capsules | 26 - (45.60) - 59 | 22.8 |
| 3 Capsules | 16 - (34.80) - 75 | 11.6 |

The invention claimed is:

1. A method of regulating the growth of a plant using an apparatus comprising a channel member defining a channel; a housing containing a capsule containing a chemical agent, the housing moveably connected to the channel member; an adjustable member moveably received within the channel of the channel member, the adjustable member moveable within the channel between an extended position for penetration of the plant to form an opening therein and insertion of the capsule from the housing; and a retracted position; and a link operably connected to the housing, wherein the link is configured to actuate movement of the housing relative to the channel member upon movement of the adjustable member to the retracted position within the channel member, wherein said movement of the housing positions the capsule for insertion into the plant by subsequent movement of the adjustable member to the extended position; the method including the steps of:
(a) moving the adjustable member within the channel member of the apparatus to the extended position to facilitate penetration of the plant to form an opening in the plant;
(b) moving the adjustable member within the channel member of the apparatus to the retracted position to facilitate the link actuating movement of the housing;
(c) moving the adjustable member within the channel member of the apparatus to the extended position to facilitate insertion of the capsule from the housing into the plant; and
(d) closing the opening formed in the plant into which the capsule is inserted.

2. The method of claim 1, wherein the plant is a woody plant.

3. The method of claim 1, wherein the opening in the plant is formed in a stem or branch of the plant.

4. The method of claim 1, wherein the capsule inserted into the plant is located within sapwood of the plant.

5. The method of claim 1, wherein the capsule is water-soluble.

6. The method of claim 5, wherein the capsule is formed from or comprises a material selected from the group consisting of water soluble alginate; polysaccharide; cellulose; polyethylene glycol, or derivatives thereof.

7. A capsule containing a chemical agent for insertion into an opening formed in a plant to regulate the growth of the plant.

8. An apparatus for insertion of a capsule into a plant, the apparatus including:
a channel member defining a channel;
a housing for containing a capsule for insertion into a plant, the housing moveably connected to the channel member;
an adjustable member moveably received within the channel of the channel member, the adjustable member moveable within the channel between an extended position for penetration of the plant to form an opening therein and insertion of the capsule from the housing, and a retracted position; and
a link operably connected to the housing, wherein the link is configured to actuate movement of the housing relative to the channel member upon movement of the adjustable member to the retracted position within the channel member, wherein said movement of the housing positions the capsule for insertion into the plant by subsequent movement of the adjustable member to the extended position.

9. The apparatus of claim 8, wherein the housing is adapted to hold a plurality of capsules for insertion into the plant and wherein the housing comprises a plurality of compartments for containing the respective plurality of capsules for insertion into the plant.

10. The apparatus of claim 8, wherein the housing comprises a central channel extending therethrough, the housing being connected to the channel member by a support shaft extending outwardly from a housing support and through the central channel of the housing which facilitates rotation of the housing relative to the channel member.

11. The apparatus of claim 10, wherein the housing support facilitates release of the housing from connection with the channel member for loading a capsule into the housing and the housing support is pivotable relative to the channel member to facilitate connection and/or release of the housing with the channel member.

12. The apparatus of claim 8, wherein the adjustable member is slidable through the channel of the channel member.

13. The apparatus of claim 8, wherein the adjustable member comprises or is engaged with a plant penetrating end.

14. The apparatus of claim 13, wherein the plant penetrating end is capable of passing though the housing and/or the housing support of the apparatus to obtain the capsule from the housing and insert the capsule from the housing into the plant.

15. The apparatus of claim 8, wherein the housing of the apparatus is adapted to contain one or more closures for closing an opening formed in the plant.

16. The apparatus of claim 9, wherein the plurality of compartments for containing the respective plurality of capsules for insertion into the plant are further adapted to contain a plurality of closures for closing an opening formed in the plant.

17. A method of inserting a capsule into a plant using an apparatus comprising a channel member defining a channel; a housing containing a capsule, the housing moveably connected to the channel member; and an adjustable member moveably received within the channel of the channel member, the adjustable member moveable within the channel between an extended position for penetration of the plant to form an opening therein and insertion of the capsule from the housing, and a retracted position; and a link operably connected to the housing, wherein the link is configured to actuate movement of the housing relative to the channel member upon movement of the adjustable member to the retracted position within the channel member, wherein said movement of the housing positions the capsule for insertion into the plant by subsequent movement of the adjustable member to the extended position, including the steps of:
(a) moving the adjustable member within the channel member of the apparatus to the extended position to facilitate penetration of a plant to form an opening in the plant;
(b) moving the adjustable member within the channel member of the apparatus to the retracted position to facilitate the link actuating movement of the housing; and
(c) moving the adjustable member within the channel member of the apparatus to the extended position to facilitate insertion of the capsule from the housing into the plant.

18. The apparatus of claim 8, wherein the housing comprises a capsule channel for containing the capsule for insertion into the plant, wherein movement of the housing relative to the channel member to position the capsule for insertion into the plant includes aligning the capsule channel with the channel of the channel member.

* * * * *

UNITED STATES PATENT AND TRADEMARK OFFICE
CERTIFICATE OF CORRECTION

| | | |
|---|---|---|
| PATENT NO. | : 11,259,516 B2 | Page 1 of 1 |
| APPLICATION NO. | : 16/631022 | |
| DATED | : March 1, 2022 | |
| INVENTOR(S) | : Riikonen et al. | |

It is certified that error appears in the above-identified patent and that said Letters Patent is hereby corrected as shown below:

In the Specification

Column 11, Line 56: delete "00" and insert -- 0° --

Column 20, Line 56: delete "(TO)" and insert -- (T0) --

Column 21, Line 26: delete "Gum" and insert -- Gum) --

Signed and Sealed this
Thirty-first Day of May, 2022

*Katherine Kelly Vidal*

Katherine Kelly Vidal
*Director of the United States Patent and Trademark Office*